(12) United States Patent
Oura

(10) Patent No.: US 10,319,222 B2
(45) Date of Patent: Jun. 11, 2019

(54) TRAFFIC CONDITION MONITORING SYSTEM, METHOD, AND STORAGE MEDIUM

(75) Inventor: Satoshi Oura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 810 days.

(21) Appl. No.: 14/112,924

(22) PCT Filed: Apr. 6, 2012

(86) PCT No.: PCT/JP2012/060087
§ 371 (c)(1),
(2), (4) Date: Oct. 19, 2013

(87) PCT Pub. No.: WO2012/144429
PCT Pub. Date: Oct. 26, 2012

(65) Prior Publication Data
US 2014/0288811 A1    Sep. 25, 2014

(30) Foreign Application Priority Data

Apr. 20, 2011 (JP) ................................. 2011-093706

(51) Int. Cl.
*G06F 19/00* (2011.01)
*G08G 1/01* (2006.01)
(Continued)

(52) U.S. Cl.
CPC ......... *G08G 1/0116* (2013.01); *G08G 1/0133* (2013.01); *G08G 1/052* (2013.01); *H04W 64/00* (2013.01)

(58) Field of Classification Search
USPC ................................................ 701/117, 119
See application file for complete search history.

(56) References Cited

U.S. PATENT DOCUMENTS 6,381,533 B1    4/2002 Crane et al.
8,948,690 B2 *  2/2015 Duerksen ........................ 455/25
(Continued)

FOREIGN PATENT DOCUMENTS

JP    2006-522403 A    9/2006

OTHER PUBLICATIONS

International Search Report in PCT/JP2012/060087 dated Jul. 17, 2012 (English Translation Thereof).
(Continued)

*Primary Examiner* — Hussein A. Elchanti
(74) *Attorney, Agent, or Firm* — McGinn IP Law Group, PLLC.

(57) ABSTRACT

A traffic condition monitoring system, provided in a base station installed by a side of a road for monitoring a traffic condition based upon communication signals transmitted from mobile terminals in a plurality of vehicles traveling on the road, includes a receiver part operable to receive the communication signals transmitted from the mobile terminals in the respective vehicles to output received signals, a speed/direction estimation part operable to estimate traveling speeds and traveling directions of the respective vehicles based upon the received signals, and a traffic condition analysis part operable to determine effective traveling speeds of the respective vehicles in each traveling direction, to calculate an average traveling speed of a group of vehicles in each traveling direction, and to analyze a traffic condition in each traveling direction based upon the average traveling speed of the group of vehicles in each traveling direction.

20 Claims, 9 Drawing Sheets

(51) Int. Cl.
*G08G 1/052* (2006.01)
*H04W 64/00* (2009.01)

(56) References Cited

U.S. PATENT DOCUMENTS

| | | | |
|---|---|---|---|
| 2006/0106622 A1 | 5/2006 | Lee | |
| 2006/0145892 A1* | 7/2006 | Gueziec | 340/905 |
| 2006/0223529 A1 | 10/2006 | Yakota et al. | |
| 2007/0208496 A1* | 9/2007 | Downs et al. | 701/117 |
| 2007/0265766 A1* | 11/2007 | Jung et al. | 701/117 |
| 2008/0071465 A1* | 3/2008 | Chapman et al. | 701/117 |
| 2010/0094531 A1* | 4/2010 | MacLeod | 701/119 |
| 2010/0175006 A1* | 7/2010 | Li | 715/764 |
| 2011/0021214 A1 | 1/2011 | Nakaji | |
| 2011/0037619 A1* | 2/2011 | Ginsberg et al. | 340/910 |
| 2012/0150425 A1* | 6/2012 | Chapman et al. | 701/119 |
| 2012/0158275 A1* | 6/2012 | Huang et al. | 701/119 |
| 2012/0296559 A1* | 11/2012 | Gueziec et al. | 701/117 |
| 2013/0207817 A1* | 8/2013 | Gueziec | 340/905 |
| 2014/0088871 A1* | 3/2014 | Gueziec | 701/533 |
| 2014/0107923 A1* | 4/2014 | Gueziec | 701/533 |

OTHER PUBLICATIONS

Written Opinion of the ISA (English Translation of the relevant part thereof).

\* cited by examiner

TRAFFIC CONDITION MONITORING SYSTEM, METHOD, AND STORAGE MEDIUM

TECHNICAL FIELD

The present invention relates to a system, a method, and a storage medium for monitoring traffic conditions.

BACKGROUND ART

Conventional traffic condition monitoring systems collect data on road conditions from vehicle detectors, traffic monitoring cameras (CCTVs: Closed Circuit Televisions), and the like and transmit the data to an information processing apparatus, which determines traffic jam or calculates the transit time based upon the collected data.

In such a traffic condition monitoring system, however, vehicle detectors, CCTVs, and equipment for transmitting data collected from those devices need to be installed on roads. As a result, conventional traffic condition monitoring systems suffer from an increased cost and an enlarged scale.

Meanwhile, use of the communication infrastructure such as the existing cellular phones has been proposed to monitor traffic conditions.

For example, Patent Literature 1 discloses a "traffic information collection system" configured to wirelessly transmit information including an ID of a mobile station, the type of a vehicle, the current position, the current time, and a vehicle speed from the mobile station to a base station and to transmit that information via a telephone network from the base station to a fixed station, which obtain traffic information, such as the volume of traffic or traffic jam on a road on which the mobile station is present, based upon such information.

In Patent Literature 1, the mobile station has a car navigation device and a cellular phone connected to the car navigation device via a communication adapter, so that information obtained by the car navigation device can wirelessly be transmitted to the base station with the cellular phone while the mobile station is moving. The car navigation device includes a driver control part for playing back a map data stored in such device as a CD-ROM, a GPS receiver for receiving positional information from artificial satellites via an antenna, and a processing unit for displaying the current position of the mobile station on the map and the traveling conditions with a display screen based upon the map data from the driver control part, the positional data from the GPS receiver, the vehicle speed data from a vehicle speed sensor for autonomous navigation, and azimuthal data from an azimuthal sensor. The cellular phone can establish a dial-up connection with the base station and wirelessly transmit data such as a position, a vehicle speed, and a road image received from the processing unit of the car navigation device via the communication adapter to the base station. Furthermore, the cellular phone can transmit the ID assigned to the mobile station, the type of the vehicle, and the current time with a dial number when the cellular phone has a dial-up connection with the base station. In each of the mobile stations, the cellular phone connects to the base station every certain period of time or every certain distance and wirelessly transmits information including data such as the ID, the type of the vehicle, the current time, the position, the vehicle speed, and the road image to the base station. Patent Literature 1 also describes that various types of position measurement devices capable of measuring the position of a mobile station can be used as a position measurement part.

Patent Literature 2 discloses a "data processing apparatus for probe traffic information" that estimates the position of a cellular phone from connection status between a cellular phone and base stations, uses the positional information as probe data, and generates traffic jam information by matching of the probe data with road map data. In this Patent Literature 2, the total traveling distance and time of a cellular phone are measured by detecting principal positions between a base station to which a cellular phone first connected to begin a call and a base station from which a cellular phone disconnected to terminate a call, and transit time at which a cellular phone passed these principal positions. The velocity (speed per hour) of the vehicle is calculated from those traveling distance and traveling time.

Patent Literature 3 discloses a "traffic information processing system" that uses communication records of cellular phones from vehicles traveling on roads to collect and distribute traffic information. In Patent Literature 3, a cellular phone with a GPS function has means for acquiring positional information such as the latitude and longitude of its location by wirelessly communicating with artificial satellites. This cellular phone with a GPS function has traffic information distribution request means for requesting a center apparatus to distribute traffic information and positional information transmission means for transmitting its positional information that has been acquired by the GPS function to the center apparatus. The center apparatus has vehicle information collection means for creating traveling data of a vehicle and creating and updating vehicle information data based upon the position and the communication time of a cellular phone having a GPS function. When a cellular phone with a GPS function is operated to start to use a traffic information distribution service, the traffic information distribution request means of the cellular phone transmits a traffic information distribution request to the center apparatus via a base station. At the same time, the positional information transmission means of the cellular phone determines the position of the cellular phone with use of artificial satellites and transmits the positional information to the center apparatus.

Meanwhile, in a communication system for cellular phones or the like, a frequency shift can be estimated from a transmission frequency of a communication signal received by a base station. For example, Non-Patent Literature 1 has proposed a method of estimating a frequency shift by observing the phase rotation of a pilot symbol inserted in a communication signal.

Furthermore, Patent Literature 4 discloses an "adaptive control apparatus" that adaptively controls the directivity of an array antenna so as to track each of mobile terminals in a continuous manner. This adaptive control apparatus disclosed in Patent Literature 4 has a setting part for setting parameters required to calculate a weighting factor based upon a received signal before or after combining. This setting part includes a Fourier transform part for performing a Fourier transform on a signal before combining that has been received by one or more antenna elements to calculate a frequency spectrum and a velocity calculation part for calculating a Doppler frequency based upon this frequency spectrum and calculating a relative speed of the mobile terminal.

Moreover, Patent Literature 5 discloses a "traveling speed detection apparatus of a mobile station" in which a base station detects a traveling speed of the mobile station by calculating the maximum Doppler frequency of a received signal from a mobile station. This traveling speed detection apparatus disclosed in Patent Literature 5 has envelope calculation means for calculating an envelope of radio waves received from the mobile station, intersection count calculation means for calculating the number of intersections over a certain period of time between the envelope calculated by the envelope calculation means and each of a plurality of predetermined levels of the received power, maximum value detection means for detecting the maximum value from among the intersection counts of respective predetermined levels that have been calculated by the intersection count calculation means, and traveling speed calculating means for calculating a traveling speed of the mobile station with use of the maximum value of the intersection counts that has been detected by the maximum value detection means.

PRIOR ART REFERENCES

Patent Literature

Patent Literature 1: JP-A 10-307993
Patent Literature 2: JP-A 2006-285567
Patent Literature 3: JP-A 2008-134957
Patent Literature 4: WO2004/066523
Patent Literature 5: JP-A 06-242225

Non-Patent Literature

Non-Patent Literature 1: Kato and Sasaoka, "Frequency Offset Compensation Method for QAM in Land Mobile Radio Communications," Journal of the Institute of Electronics, Information and Communication of Engineers of Japan, Volume J74-B2, pp. 493-496.

SUMMARY OF INVENTION

Problem(s) to be Solved by Invention

However, Patent Literatures 1 to 5 and Non-Patent Literature 1 suffer from the following problems.

In Patent Literature 1, the cellular phone is connected to the car navigation device via the communication adapter. The positional information received by the GPS receiver provided in the car navigation device and the vehicle speed data detected by the vehicle speed sensor are transmitted to the base station via the cellular phone. Therefore, according to Patent Literature 1, traffic information cannot be collected for mobile stations (vehicles) having no car navigation device. Furthermore, Patent Literature 1 describes that the position of a mobile station may be measured with various kinds of position measurement devices. However, each of mobile stations needs to have a vehicle speed sensor in order to measure a vehicle speed of the mobile station. Moreover, Patent Literature 1 does not consider a traveling direction of a mobile station.

Patent Literature 2 determines traffic information from a base station that receives communication information transmitted by a cellular phone and from a coverage area of a receiving sector of the base station. Therefore, Patent Literature 2 can only use rough positional information or a rough vehicle speed, lowering the accuracy of the traffic information. Furthermore, Patent Literature 2 does not consider a traveling direction of a vehicle.

In Patent Literature 3, a cellular phone with a GPS function transmits its positional information to a center apparatus only during use of a traffic information distribution service. Furthermore, Patent Literature 3 does not calculate a traveling speed of a vehicle or consider a traveling direction of a vehicle. Therefore, according to Patent Literature 3, only the position of a cellular phone (vehicle) can be obtained as traffic information.

Non-Patent Literature 1 merely proposes a method of estimating a frequency shift.

Patent Literature 4 merely discloses calculating a relative speed of a mobile terminal with use of a Doppler frequency. Patent Literature 4 fails to disclose or suggest any association between a calculated relative speed of a mobile terminal and traffic conditions such as traffic jam. Patent Literature 4 does not consider a traveling direction of a mobile terminal.

Patent Literature 5 merely discloses an example of a method of calculating a traveling speed of a mobile station from a Doppler frequency. Patent Literature 5 also fails to disclose or suggest any association between a calculated traveling speed of a mobile station and traffic conditions such as traffic jam. Patent Literature 5 does not consider a traveling direction of a mobile station.

In such traffic condition monitoring systems, it is important to know not only a traveling speed of each vehicle, but also a traveling direction of each vehicle in order to evaluate traffic conditions more precisely.

It is, therefore, an object of the present invention to provide a small-scale, low-cost traffic condition monitoring system that can more precisely evaluate a traffic condition by using cellular phone infrastructure, and a method and a storage medium for such a traffic condition monitoring system.

Means for Solving Problem(s)

A traffic condition monitoring system according to the present invention is provided in a base station installed by a side of a road for monitoring a traffic condition based upon communication signals transmitted from mobile terminals in a plurality of vehicles traveling on the road. The system has a receiver part operable to receive the communication signals transmitted from the mobile terminals of the respective vehicles to output received signals, a speed/direction estimation part operable to estimate traveling speeds and traveling directions of the respective vehicles based upon the received signals, and a traffic condition analysis part operable to determine effective traveling speeds of the respective vehicles in each traveling direction, to calculate an average traveling speed of a group of vehicles in each traveling direction, and to analyze a traffic condition in each traveling direction based upon the average traveling speed of the group of vehicles in each traveling direction.

A traffic condition monitoring method according to the present invention is used in a traffic condition monitoring system provided in a base station installed by a side of a road, for monitoring a traffic condition based upon communication signals transmitted from mobile terminals in a plurality of vehicles traveling on the road. The method includes a speed/direction estimation step of estimating traveling speeds and traveling directions of the respective vehicles based upon received signals of a receiver part that has received the communication signals transmitted from the mobile terminals in the vehicles, and a traffic condition analysis step of determining effective traveling speeds of the respective vehicles in each traveling direction. of calculating an average traveling speed of a group of vehicles in each traveling direction, and of analyzing a traffic condition in each traveling direction based upon the average traveling, speed of the group of vehicles in each traveling direction.

A storage medium according to the present invention is a computer-readable storage medium having a program recorded thereon for allowing a computer of a traffic condition monitoring system provided in a base station installed by a side of a road to monitor a traffic condition based upon communication signals transmitted from mobile terminals in a plurality of vehicles traveling on the road. The program causes the computer to implement a speed/direction estimation function of estimating traveling speeds and traveling directions of the respective vehicles based upon received signals of a receiver part that has received the communication signals transmitted from the mobile terminals in the vehicles, and a traffic condition analysis function of determining effective traveling speeds of the respective vehicles in each traveling direction, of calculating an average traveling speed of a group of vehicles in each traveling direction, and of analyzing a traffic condition in each traveling direction based upon the average traveling speed of the group of vehicles in each traveling direction.

Advantageous Effects of Invention

A traffic condition monitoring system according to the present invention can more precisely evaluate a traffic condition by using cellular phone infrastructure.

MODE FOR CARRYING OUT INVENTION

Exemplary embodiments of the present invention will be described below.

Some features of exemplary embodiments of the present invention will be described.

Certain embodiments of the present invention employ the cellular phone infrastructure such that a base station calculates a frequency shift of a communication signal transmitted from a mobile terminal of each of vehicles, estimates a traveling speed and a traveling direction of each of the vehicles, and thus provides a small-scale, low-cost traffic condition monitoring system.

The traffic condition monitoring system employs the existing communication infrastructure such as cellular phones and collects traffic conditions with communication signals transmitted from mobile terminals mounted on vehicles traveling on roads or from mobile terminals held by passengers of vehicles. A frequency shift of a mobile terminal can be estimated by a base station. The estimation results of the frequency shifts are collected from base stations and analyzed, so that traveling speeds and traveling directions of the vehicles can be measured. Therefore, a small-scale, low-cost traffic condition monitoring system can be provided merely by adding, to the existing base stations for cellular phones or the like that have been installed by the side of roads, a device operable to calculate and analyze a traveling speed and a traveling direction of each vehicle based upon an estimation result of a frequency shift.

Next, the principle of certain exemplary embodiments of the present invention will be described.

It has been known that the frequency of a communication signal transmitted from a mobile terminal approaching directly toward or moving directly away from a base station shifts due to the Doppler effect. When the transmission frequency of a transmission signal (communication signal) transmitted from a mobile terminal is defined as $f_0$, the traveling speed of a vehicle having a mobile terminal mounted thereon or a vehicle in which a passenger has a mobile terminal is defined as v, and the speed of light is defined as c, then the received frequency of a received signal at the base station shifts from the transmission frequency by $\Delta f$, which is calculated by the following formula 1.

$$\Delta f = \frac{v}{c} f_0 \qquad \text{Formula 1}$$

When the mobile terminal is approaching the base station, $\Delta f$ will be a positive value. When the mobile terminal is moving away from the base station, $\Delta f$ will be a negative value.

Figure 3:
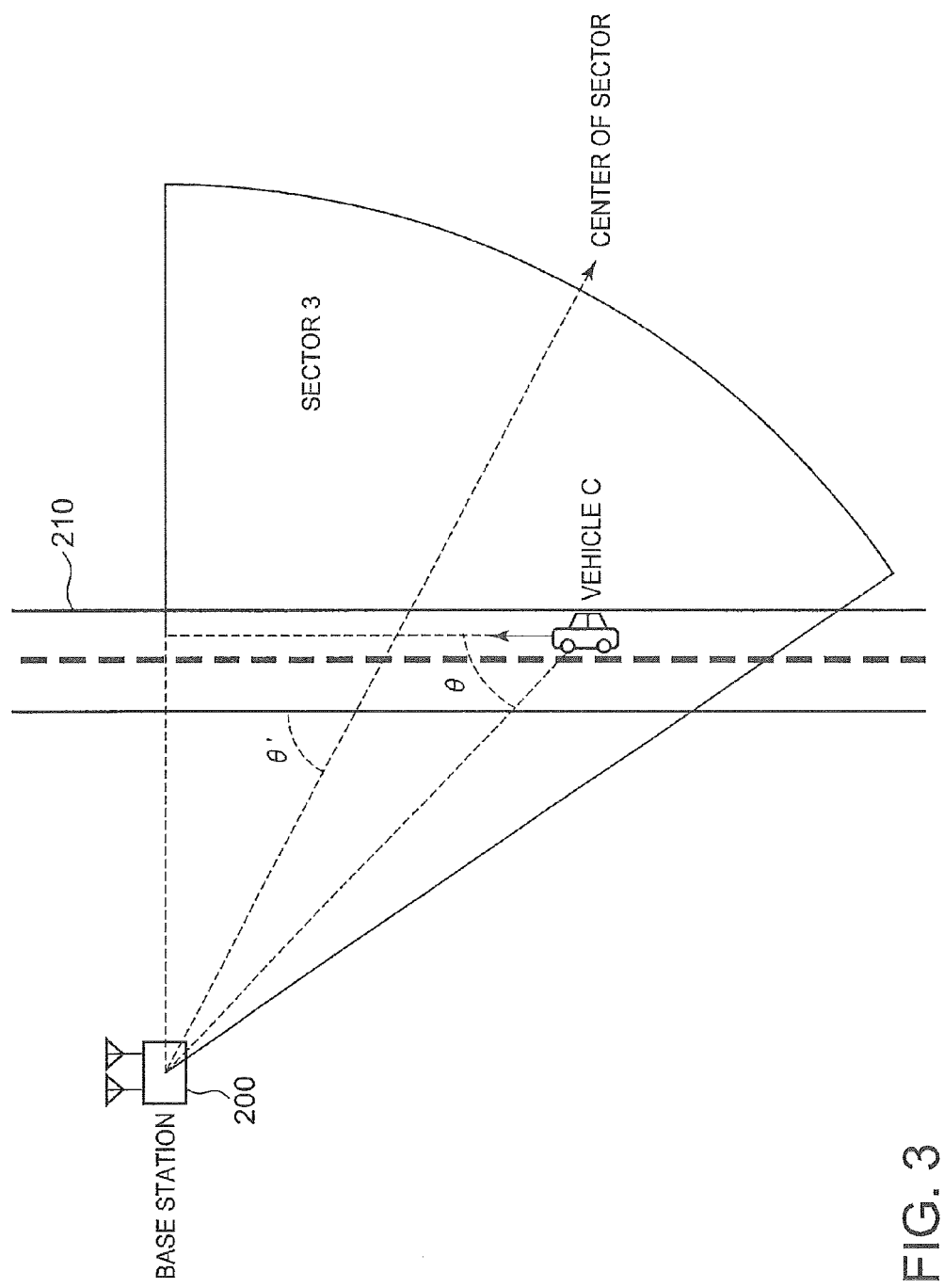
FIG. 3 is a schematic plan view showing an example of an angle between a line connecting a vehicle to the base station and a traveling direction of the vehicle and an angle between a central direction of a sector and the road.

In practice, as shown in FIG. 3, a base station 200 is installed at a position that is remote from a road 210 to some extent. Therefore, when an angle (included angle) between a line connecting a vehicle to the base station and a direction in which the road extends is defined as $\theta$, then $\Delta f$ is expressed by the following formula 2.

$$\Delta f = \frac{v}{c} f_0 \cos\theta \qquad \text{Formula 2}$$

Such a relationship is utilized to estimate a frequency shift of a communication signal transmitted from a mobile terminal. Thus, a traveling speed and a traveling direction of a vehicle can be estimated.

Specifically, traveling speeds and traveling directions of a plurality of vehicles can be calculated by estimating frequency shifts of communication signals transmitted from mobile terminals mounted on the vehicles or mobile terminals held by passengers in the vehicles. Thus, traffic conditions can be determined.

Furthermore, another exemplary embodiment of the present invention employs the existing cellular phone infrastructure, calculates a traveling speed and a traveling direction of a vehicle from a communication signal including positional information that is periodically transmitted from a mobile terminal of a vehicle traveling on a road, and analyzes traffic conditions. Thus, a low-cost, small-scale traffic condition monitoring system is provided.

Example 1

Figure 1:
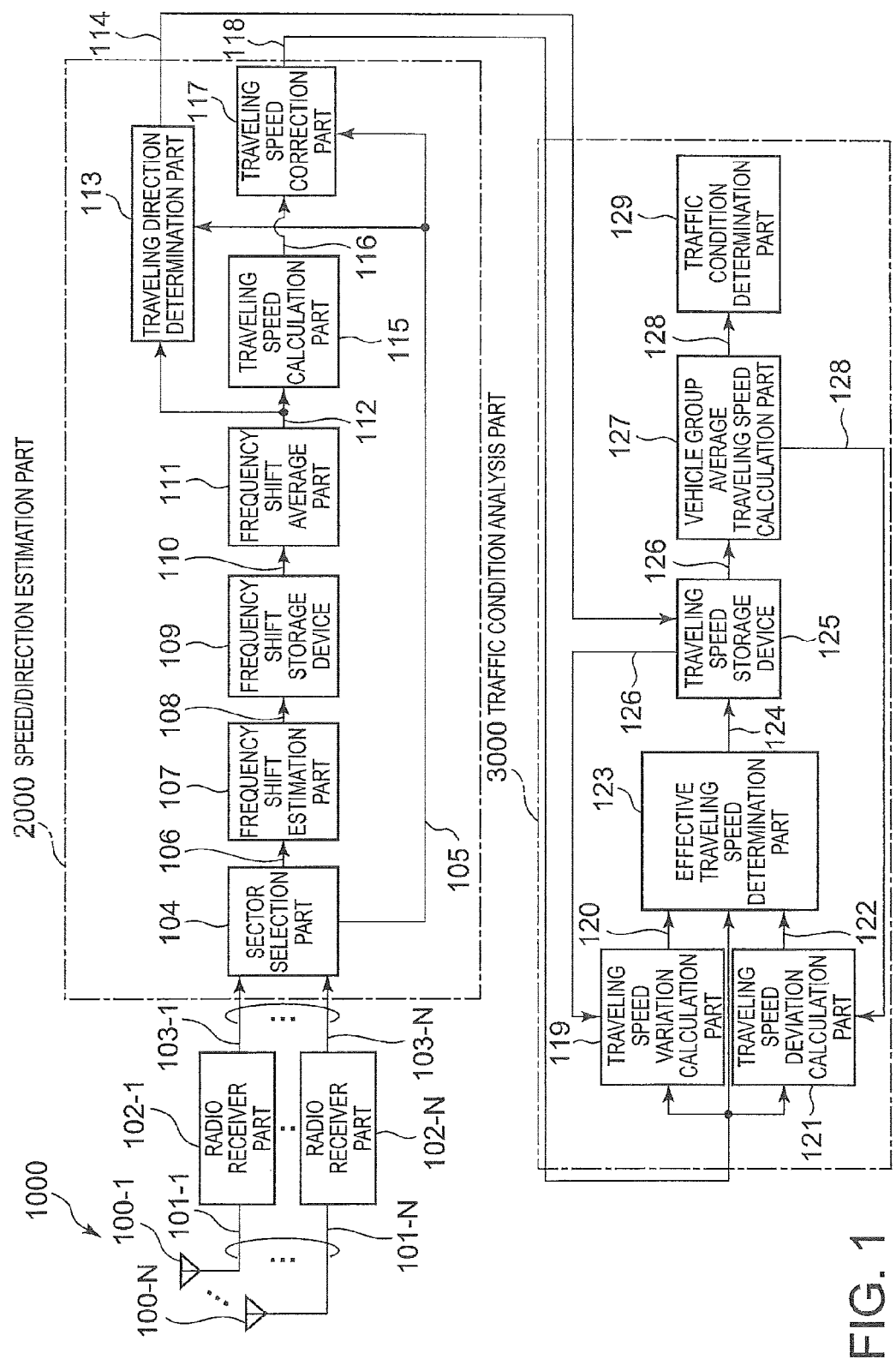
FIG. 1 is a block diagram showing a configuration of a traffic condition monitoring system according to a first example of the present invention.

Referring to FIG. 1, a traffic condition monitoring system according to a first example of the present invention will be described. The illustrated traffic condition monitoring system is provided in a base station 200 (see FIG. 2) installed by the side of a road 210 (see FIG. 2). The traffic condition monitoring system monitors traffic conditions based upon communication signals transmitted from mobile terminals in a plurality of vehicles traveling on the road 210.

The illustrated traffic condition monitoring system has a receiver part 1000, a speed/direction estimation part 2000, and a traffic condition analysis part 3000. The receiver part 1000 is operable to receive communication signals transmitted from the mobile terminals of the vehicles to output received signals. The speed/direction estimation part 2000 is operable to estimate traveling speeds and traveling directions of the respective vehicles based upon the received signals. The traffic condition analysis part 3000 is operable to determine effective traveling speeds of the respective vehicles in each traveling direction, calculate an average traveling speed of a group of vehicles in each traveling direction, and analyze traffic conditions in each traveling direction based upon the average traveling speed of the group of vehicles in each traveling direction.

The receiver part 1000 includes first to Nth sector antennas 100-1 to 100-N (where N is an integer not less than 2) operable to receive communication signals (radio signals) from mobile terminals (not shown) mounted on the respective vehicles (mobile stations) or mobile terminals (not shown) of passengers riding in the respective vehicles (mobile stations) to output first to Nth radio signals 101-1 to 101-N, and first to Nth radio receiver parts 102-1 to 102-N operable to convert the first to Nth radio signals 101-1 to 101-N received into first to Nth baseband signals 103-1 to 103-N. The first to Nth baseband signals 103-1 to 103-N are output as the received signals.

The speed/direction estimation part 2000 includes a sector selection part 104, a frequency shift estimation part 107, a frequency shift storage device 109, a frequency shift average part 111, a traveling direction determination part 113, a traveling speed calculation part 115, and a traveling speed correction part 117.

The sector selection part 104 is operable to select a received signal (baseband signal) of a sector having the best reception quality from among the first to Nth baseband signals 103-1 to 103-N to output a received signal 106 of the selected sector and the selected sector number 105. The frequency shift estimation part 107 is operable to estimate a frequency shift from the received signal (baseband signal) of the selected sector to output a frequency shift signal 108 indicative of the estimated frequency shift. The frequency shift storage device 109 is operable to store the frequency shift signal 108 indicative of the estimated frequency shift in a continuous manner. The frequency shift average part 111 is operable to read frequency shift signals 110 stored for each average period from the frequency shift storage device 109, calculate an average frequency shift to output an average frequency shift signal 112 indicative of the average frequency shift. The traveling direction determination part 113 is operable to determine a traveling direction of the vehicles from the selected sector number 105 and the average frequency shift, which is represented by the average frequency shift signal 112, to output a traveling direction signal 114 indicative of the traveling direction of the vehicles. The traveling speed calculation part 115 is operable to calculate a relative traveling speed of the vehicles with respect to the base station 200 (FIG. 2) from the average frequency shift, which is represented by the average frequency shift signal 112, to output a relative traveling speed signal 116 indicative of the relative traveling speed of the vehicles. The traveling speed correction part 117 is operable to correct the relative traveling speed of the vehicles, which is represented by the relative traveling speed signal 116, based upon the selected sector number 105, thus calculate a traveling speed of the vehicles to output a traveling speed signal 118 indicative of the traveling speed of the vehicles.

A combination of the frequency shift estimation part 107, the frequency shift storage device 109, and the frequency shift average part 111 functions as a frequency shift calculation part operable to estimate frequency shifts of the respective vehicles from the received signals 106 of the selected sector and calculate an average frequency shift by averaging the frequency shifts.

The traffic condition analysis part 3000 includes a traveling speed variation calculation part 119, a traveling speed deviation calculation part 121, an effective traveling speed determination part 123, a traveling speed storage device 125, a vehicle group average traveling speed calculation part 127, and a traffic condition determination part 129.

The traveling speed variation calculation part 119 is operable to calculate a variation of the current traveling speed from the last traveling speed. The traveling speed deviation calculation part 121 is operable to calculate a deviation of the traveling speed. The effective traveling speed determination part 123 is operable to determine that the traveling speed data are effective when the traveling speed and the variation and deviation thereof are not more than predetermined threshold values. The traveling speed storage device 125 is operable to store effective traveling speed signals 124 for the respective vehicles in each traveling direction. The vehicle group average traveling speed calculation part 127 is operable to read effective traveling speed signals of all vehicles in each traveling direction from the traveling speed storage device 125, calculate an average of the effective traveling speeds of all vehicles to calculate an average traveling speed of a group of vehicles in each traveling direction, and output a vehicle group average traveling speed signal 128 in each traveling direction that indicates the average traveling speed of the group of vehicles in each traveling direction. The traffic condition determination part 129 determines traffic conditions in each traveling direction based upon the average traveling speed of the group of vehicles in each traveling direction, which is represented by the vehicle group average traveling speed signal 128 in each traveling direction.

Specifically, the traveling speed variation calculation part 119 reads an effective traveling speed signal of a vehicle that was calculated the last time, as the last traveling speed signal 126 indicative of the last traveling speed, from the traveling speed storage device 125 and calculates a variation 120 of the current traveling speed of the vehicle from the last traveling speed. The traveling speed deviation calculation part 121 calculates a deviation 122 of the current traveling speed of the vehicle with respect to the average traveling speed of a group of vehicles in each traveling direction, which is represented by the vehicle group average traveling speed signal 128 in each traveling direction. The effective traveling speed determination part 123 determines whether or not the current traveling speed of the vehicle, which is represented by the traveling speed signal 118, is effective based upon the variation 120 and the deviation 122 and output an effective traveling speed signal 124 when it determines that the current traveling speed of the vehicle is effective.

Therefore, a combination of the traveling speed variation calculation part 119, the traveling speed deviation calculation part 121, and the effective traveling speed determination part 123 functions as an effective speed determination part operable to determine, for each vehicle, whether or not the current traveling speed of the vehicle, which is represented by the traveling speed signal 118, is effective, in cooperation with the traveling speed storage device 125, to output the effective traveling speed signal 124 indicative of an effective traveling speed.

Figure 2:
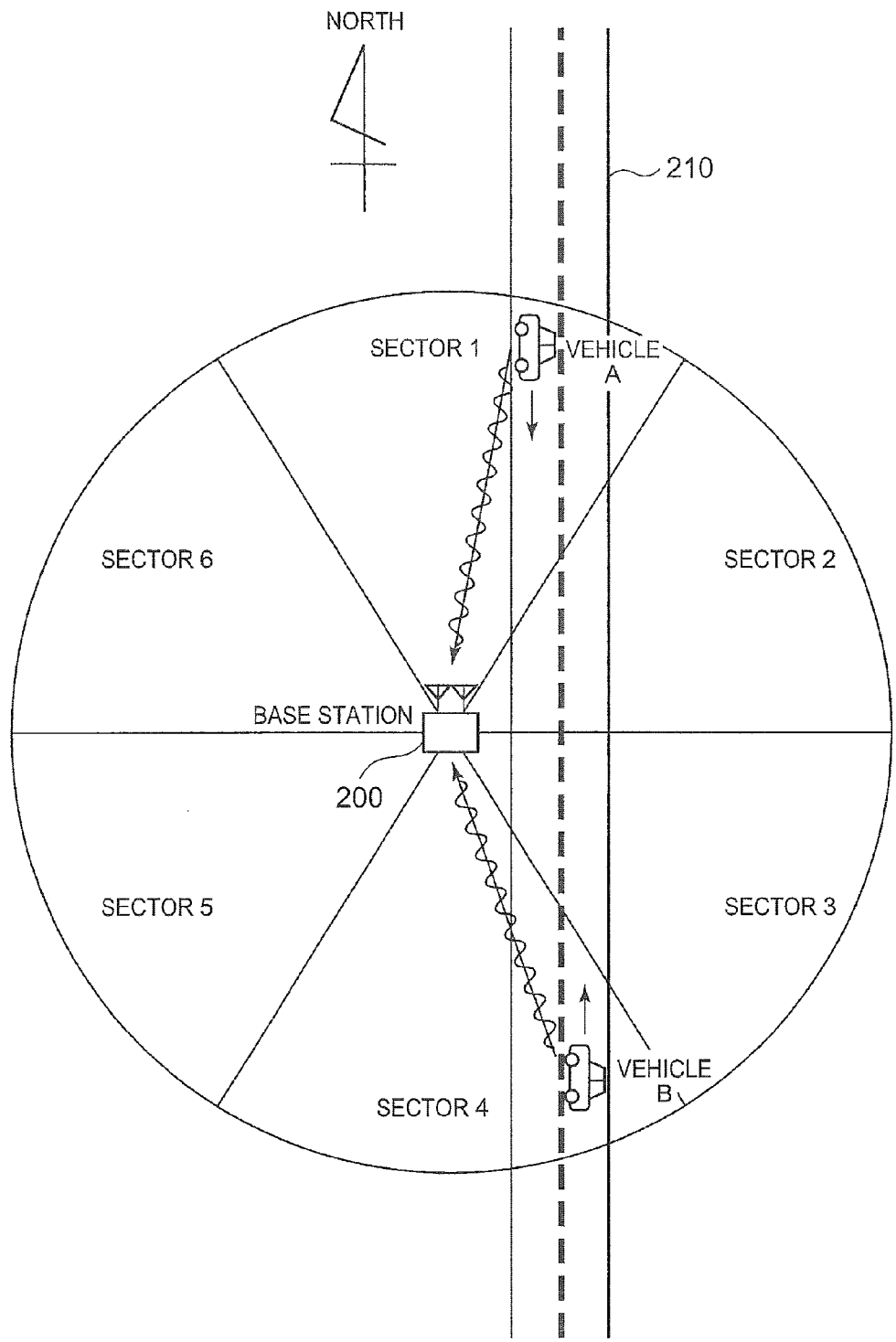
FIG. 2 is a schematic plan view showing an example of a sector arrangement of antennas of a base station installed by the side of a road.

The base station 200 with the first to Nth sector antennas 100-1 to 100-N for N sectors where N is integer not less than 2 is installed, for example, with a sector arrangement as shown in FIG. 2, by the side of the road 210.

In the example illustrated in FIG. 2, the road 210 extends from north to south, and the base station 200 is arranged by the west side of the road 210. Furthermore, in the illustrated example, a plurality of sectors are arranged at equal angular intervals of 60 degrees about the base station 200. The number of the sectors N is six. The sectors 1 to 6 are sequentially arranged clockwise about the base station 200 from the sector 1, whose central direction is directed to the north with respect to the base station 200, to the sector 6. In other words, the central direction of the sector 2 is directed to the east-northeast with respect to the base station 200. The central direction of the sector 3 is directed to the east-southeast. The central direction of the sector 4 is directed to the south with respect to the base station 200. The central direction of the sector 5 is directed to the west-southwest with respect to the base station 200. The central direction of the sector 6 is directed to the west-northwest with respect to the base station 200. The first to sixth sector antennas 100-1 to 100-6 are provided for the sectors 1 to 6, respectively.

Furthermore, in the example of FIG. 2, a vehicle A is on the road 210 within the sector 1 in the north of the base station 200 and is travelling southward on the road 210. A vehicle B is on the road 210 within the sector 4 in the south of the base station 200 and is traveling northward on the road 210.

In this case, as shown in FIG. 2, only the first to fourth sector antennas 100-1 to 100-4 for the sectors 1 to 4 can receive communication signals from mobile terminals of the vehicles A and B on the road 210. Thus, for first to fourth baseband signals (received signals) 103-1 to 103-4 that have been received by the first to fourth sector antennas 100-1 to 100-4 for the sectors 1 to 4 and output by the first to fourth radio receiver parts 102-1 to 102-4, the sector selection part 104 calculates the received power, for example, as an index of the reception quality for each mobile terminal, selects a received signal (baseband signal) from the sector having the highest received power to output that received signal (baseband signal).

In the example of FIG. 2, for the vehicle A within the sector 1, the sector selection part 104 determines that the first baseband signal 103-1 that has been transmitted from the mobile terminal of the vehicle A, received by the first sector antenna 100-1, and output by the first radio receiver part 102-1 is a received signal (baseband signal) of a sector having the highest received power, selects the sector 1 as a selected sector, and outputs a selected sector number 105 indicative of the sector 1. Furthermore, for the vehicle B within the sector 4, the sector selection part 104 determines that the fourth baseband signal 103-4 that has been transmitted from the mobile terminal of the vehicle B, received by the fourth sector antenna 100-4, and output by the fourth radio receiver part 102-4 is a received signal (baseband signal) of a sector having the highest received power, selects the sector 4 as a selected sector, and outputs a selected sector number 105 indicative of the sector 4.

Furthermore, the sector selection part 104 outputs a received signal (baseband signal) only when the highest received power is nor less than a preset threshold value. Thus, baseband signals with low reception quality are discarded. Therefore, communication signals transmitted from distant mobile terminals that are not on the nearby road 210 can be excluded.

For the received signal (baseband signal) 106 of the selected sector, the frequency shift estimation part 107 performs a channel estimation on, for example, a pilot symbol inserted in the received signal to calculate a phase rotation of the symbol and estimate a frequency shift. The frequency shift estimation part 107 stores a frequency shift signal 108 indicative of the estimated frequency shift in the frequency shift storage device 109. The frequency shift average part 111 reads frequency shift signals 110 from the frequency shift storage device 109 for each preset average period, calculates an average of the frequency shift signals 110 to output the average to a subsequent stage, and then deletes the contents of the frequency shift storage device 109. Thus, frequency shifts are averaged over a plurality of reception periods. Therefore, influence of an estimation error of the frequency shift can be reduced.

With use of the Doppler effect that the frequency shift becomes positive when a vehicle is approaching the base station 200 and becomes negative when a vehicle is moving away from the base station 200, the traveling direction determination part 113 determines the traveling direction of a vehicle based upon the polarity of the average frequency shift. However, the relationship between the polarity of the frequency shift and the traveling direction differs depending upon the selected sector. Therefore, the traveling direction determination part 113 should determine the traveling direction of a vehicle depending upon the selected sector number 105 output by the sector selection part 104.

In the example of FIG. 2, the sectors 1 and 2 are directed northward with respect to the base station 200. Therefore, when a frequency shift of the first and second radio signals 101-1 and 101-2 received by the first and second sector antennas 100-1 and 100-2 for the sectors 1 and 2 is positive, the vehicle is traveling southward. When the frequency shift is negative, the vehicle is traveling northward. On the other hand, the sectors 3 and 4 are directed southward with respect to the base station 200. Therefore, when a frequency shift of the third and fourth radio signals 101-3 and 101-4 received by the third and fourth sector antennas 100-3 and 100-4 for the sectors 3 and 4 is positive, the vehicle is traveling northward. When the frequency shift is negative, the vehicle is traveling southward.

The traveling speed calculation part 115 calculates a relative traveling speed v' with respect to the base station 200 from the relationship of the Doppler effect between the traveling speed and the frequency shift by the following formula 3 using an average frequency shift, which is represented by the average frequency shift signal 112. Wherein, the transmission frequency set at a mobile terminal is defined as $f_0$, the speed of light is defined as c, and the average frequency shift is defined as $\Delta f'$. All of those values are known at the base station 200.

$$v' = \frac{c \Delta f'}{f_0} \quad \text{Formula 3}$$

The term $\Delta f'$ in the above formula 3 represents an average frequency shift observed by the base station 200. The relative traveling speed v' becomes equal to the traveling speed of a vehicle only when the vehicle moves directly toward or away from the base station 200. In practice, as shown in FIG. 3, the base station 200 is installed at a position that is remote from the road 210 to some extent. Thus, the vehicle C moves at an angle θ with respect to the base station 200. Accordingly, the traveling speed correction part 117 needs to correct the traveling speed of the vehicle C by using the following formula 4.

$$v = \frac{v'}{\cos \theta} \quad \text{Formula 4}$$

Wherein, as shown in FIG. 3, θ is an angle (included angle) between a line connecting the vehicle C to the base station 200 and the traveling direction of the vehicle C. However, a sector antenna cannot obtain the exact angle θ. Therefore, the traveling speed correction part 117 corrects the traveling speed with the following formula 5 using an angle (included angle) θ' between the central direction of the sector selected by the sector selection part 104 (the sector 3 in the example of FIG. 3) and the longitudinal direction of the road 210.

$$v = \frac{v'}{\cos \theta'} \quad \text{Formula 5}$$

The traveling speed variation calculation part 119 reads the traveling speed signal of the vehicle that was calculated last time, as the last traveling speed signal 126 indicative of the last traveling speed, from the traveling speed storage device 125 and calculates a variation 120 of the current traveling speed of the vehicle, which is represented by the traveling speed signal 118, from the last traveling speed. The traveling speed deviation calculation part 121 calculates a deviation 122 of the current traveling speed of the vehicle, which is represented by the traveling speed signal 118, with respect to the vehicle group average traveling speed signal 128 in each traveling direction, which represents an average traveling speed of all vehicles in each traveling direction.

In order to enhance the reliability of the traveling speed data, the effective traveling speed determination part 123 determines that the current traveling speed represented by the traveling speed signal 118 is an effective traveling speed only if each of the current traveling speed of the vehicle, which is represented by the traveling speed signal 118, and the variation 120 and the deviation 122 of the traveling speed is not more than a preset threshold value. The effective traveling speed determination part 123 stores an effective traveling speed signal 124, which represents an effective traveling speed, in the traveling speed storage device 125 for each vehicle in each traveling direction.

Wherein, a threshold value is individually set for each of the traveling speed of the vehicle, which is represented by the traveling speed signal 118, the variation 120, and the deviation 122. For example, since a usual vehicle is unlikely to travel at a speed higher than 200 km/h, a threshold value for the traveling speed is set at 200 km/h so that a traveling speed higher than 200 km/h is discarded. Furthermore, a variation of the traveling speed is unlikely to be extremely large. For example, a usual speed variation as compared to the last traveling speed is unlikely to be larger than 10 km/h. Therefore, a threshold value for the variation is set at 10 km/h so that a traveling speed having a speed variation larger than 10 km/h is discarded. Moreover, for when the vehicle group average traveling speed 128 is 40 km/h, a vehicle traveling at a speed of 80 km/h may possibly be an exceptional vehicle such as a vehicle traveling on a shoulder of a road during traffic jam. Additionally, a mobile terminal traveling at a speed of 5 km/h is likely to be a mobile terminal of a pedestrian, rather than a mobile terminal of a vehicle. Therefore, a traveling speed having a deviation to the vehicle group average traveling speed 128 that is larger than 30 km/h is discarded.

The vehicle group average traveling speed calculation part 127 reads the effective traveling speed signals 126 of all vehicles in each traveling direction from the traveling speed storage device 125 and calculates an average of the effective traveling speeds of all vehicles. The transmission frequency of mobile terminals suffers from errors caused by individual differences of internal oscillators. Traveling speeds of a plurality of vehicles are averaged in the above manner so that influences from such errors can be eliminated. Furthermore, the vehicle group average traveling speed calculation part 127 calculates a time average of the calculated average traveling speed of all vehicles for a predetermined period of time so as to smooth the traveling speed. Thus, the vehicle group average traveling speed calculation part 127 outputs a vehicle group average traveling speed signal 128 in each traveling direction, which indicates a vehicle group average traveling speed in each traveling direction. Wherein, the reliability of traveling speed data can further be enhanced by not using traveling speed data during a specific period for which received signals from mobile terminals other than mobile terminals mounted on vehicles are expected to increase. For example, when a railway runs near the road 210 to be monitored, traveling speeds of vehicles that are received during periods of time when trains pass are excluded from the averaging samples.

The traffic condition determination part 129 compares the vehicle group average traveling speed signal 128 in each traveling direction with a threshold value for determining traffic conditions and determines traffic conditions in each traveling direction with reference to pre-inputted event information such as traffic accidents. For example, the traffic condition determination part 129 determines traffic conditions of each traveling direction among "smooth," "spontaneously congested," "spontaneously jammed," "congested by accident," and "jammed by accident" with use of a congestion threshold value, a jam threshold value, and accident occurrence information as illustrated in a flow chart of FIG. 4.

Figure 4:
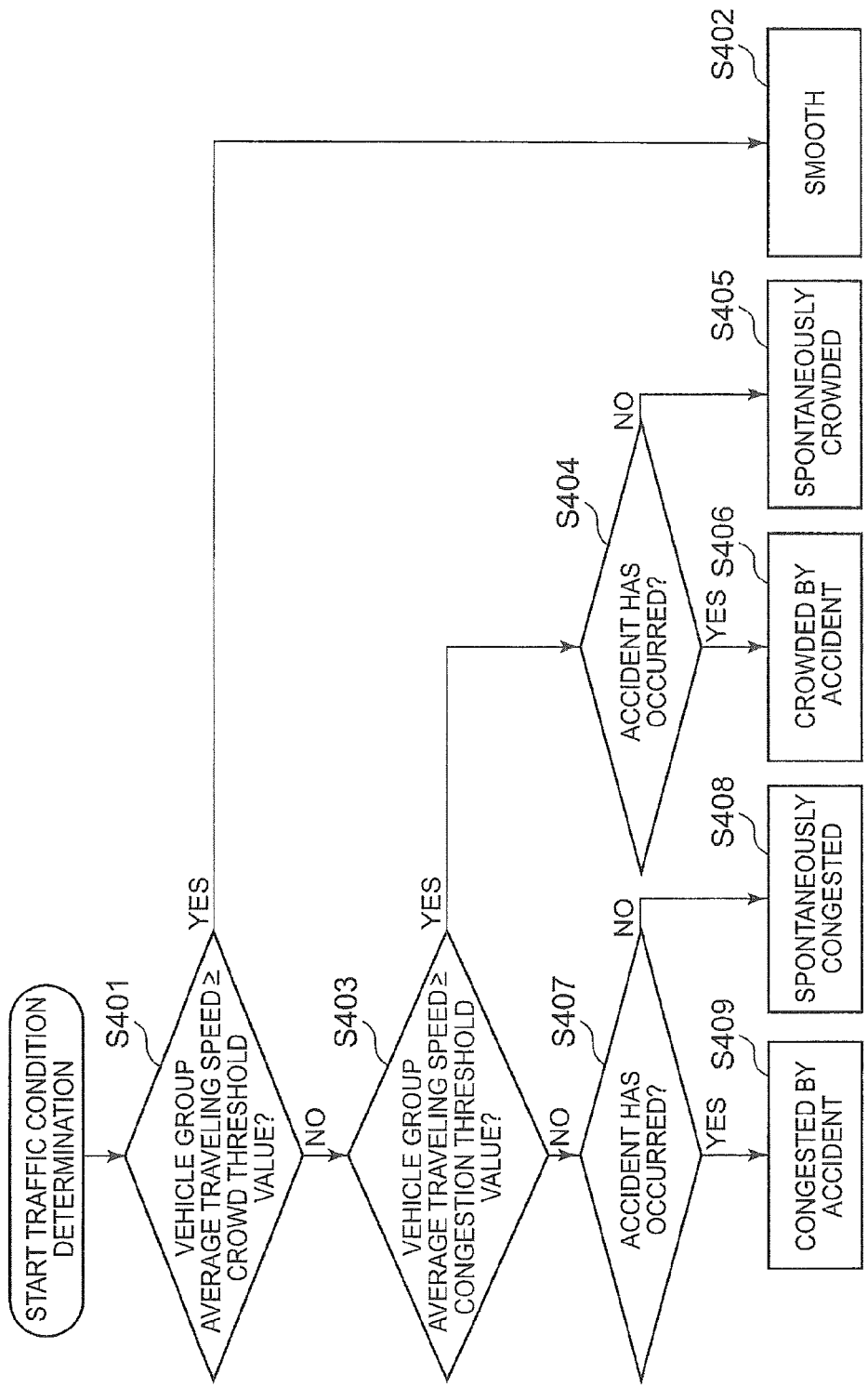
FIG. 4 is a flow chart explanatory of an operation of a traffic condition determination part used in the traffic condition monitoring system illustrated in FIG. 1.

Referring to FIG. 4, a traffic condition determination operation by the traffic condition determination part 129 will be described.

First, the traffic condition determination part 129 compares the vehicle group average traveling speed signal 128 in each traveling direction with the congestion threshold value (Step S401). If the vehicle group average traveling speed signal 128 in each traveling direction is not less than the congestion threshold value (Yes at Step S401), then the traffic condition determination part 129 determines the traffic conditions as "smooth" (Step S402).

If the vehicle group average traveling speed signal 128 in each traveling direction is less than the congestion threshold value (No at Step S401), then the traffic condition determination part 129 compares the vehicle group average traveling speed signal 128 in each traveling direction with the jam threshold value (Step S403). If the vehicle group average traveling speed signal 128 in each traveling direction is not less than the jam threshold value (Yes at Step S403), then the traffic condition determination part 129 determines from the accident occurrence information whether or not any accident has occurred (Step S404). If no accident has occurred (No at Step S404), the traffic condition determination part 129 determines the traffic conditions as "spontaneously congested" (Step S405). If any accident has occurred (Yes at Step S404), the traffic condition determination part 129 determines the traffic conditions as "congested by accident" (Step S406).

If the vehicle group average traveling speed signal 128 in each traveling direction is less than the jam threshold value (No at Step S403), then the traffic condition determination part 129 determines from the accident occurrence information whether or not any accident has occurred (Step S407). If no accident has occurred (No at Step S407), the traffic condition determination part 129 determines the traffic conditions as "spontaneously jammed" (Step S408). On the other hand, if any accident has occurred (Yes at Step S407), the traffic condition determination part 129 determines the traffic conditions as "jammed by accident" (Step S409).

In the example of FIG. 4, the traffic condition determination part 129 determines the traffic conditions of each traveling direction among "smooth," "spontaneously congested," "spontaneously jammed," "congested by accident," and "jammed by accident," based upon the congestion threshold value, the jam threshold value, and the accident occurrence information. Nevertheless, the accident occurrence information may be omitted. In such a case, Steps S404 and S407 in FIG. 4 can be eliminated. Thus, the traffic condition determination part 129 determines the traffic conditions of each traveling direction among "smooth," "congested," and "jammed," based upon the congestion threshold value and the jam threshold value. Furthermore, one of the congestion threshold value and the jam threshold value may be eliminated from the congestion threshold value, the jam threshold value, and the accident occurrence information.

Next, an operation of the traffic condition monitoring system illustrated in FIG. 1 will be described below.

The first to Nth radio signals 101-1 to 101-N received by the first to Nth sector antennas 100-1 to 100-N are respectively converted into the first to Nth baseband signals 103-1 to 103-N by the first to Nth radio receiver parts 102-1 to 102-N. The sector selection part 104 calculates the reception quality of a mobile terminal for each of the sectors with the first to Nth baseband signals 103-1 to 103-N. If the reception quality of a sector having the best reception quality is not less than a threshold value, the sector selection part 104 outputs the baseband signal (received signal) 106 of the selected sector and outputs the selected sector number 105 to the traveling direction determination part 113 and the traveling speed correction part 117. If the reception quality of the selected sector is less than the threshold value, the sector selection part 104 discards the baseband signal of the mobile terminal so that subsequent processes are not performed.

The frequency shift estimation part 107 estimates a frequency shift with respect to the baseband signal 106 of the selected sector and stores a frequency shift signal 108 indicative of the estimated frequency shift in the frequency shift storage device 109. The frequency shift average part 111 reads frequency shift signals 110 for each average period from the frequency shift storage device 109, calculates an average frequency shift to output an average frequency shift signal 112 indicative of the average frequency shift, and then deletes the contents of the frequency shift storage device 109.

The traveling direction determination part 113 determines a traveling direction of the vehicle from the selected sector number 105 and the polarity of the average frequency shift signal 112 to output a traveling direction signal 114 indicative of the traveling direction of the vehicle. The traveling speed calculation part 115 calculates a relative traveling speed of the vehicle with respect to the base station 200 from the average frequency shift signal 112 to output a relative traveling speed signal 116 indicative of the relative traveling speed of the vehicle. The traveling speed correction part 117 corrects the relative traveling speed signal 116 based upon the selected sector number 105 to output a traveling speed signal 118 indicative of the corrected traveling speed of the vehicle.

The traveling speed variation calculation part 119 reads the effective traveling speed signal that was calculated last time as the last traveling speed signal 126 indicative of the last traveling speed from the traveling speed storage device 125. The traveling speed variation calculation part 119 calculates and outputs a variation 120 of the current traveling speed of the vehicle with respect to the last traveling speed. The traveling speed deviation calculation part 121 calculates and outputs a deviation 122 of the current traveling speed of the vehicle with respect to the average traveling speed of a group of vehicles in each traveling direction, which is represented by the vehicle group average traveling speed signal 128 in each traveling direction.

The effective traveling speed determination part 123 compares the traveling speed signal 118 and the variation 120 and the deviation 122 of the traveling speed with the threshold values. The effective traveling speed determination part 123 stores the effective traveling speed signal 124 for each vehicle in the traveling direction, which is represented by the traveling direction signal 114, in the traveling speed storage device 125 only if none of the traveling speed signal 118, the variation 120, and the deviation 122 are greater than the threshold value. If any of the traveling speed, the variation, and the deviation is greater than the threshold value, the effective traveling speed determination part 123 discards the traveling speed so that subsequent processes are not performed.

The vehicle group average traveling speed calculation part 127 reads from the traveling speed storage device 125 the effective traveling speed signals 126 of all vehicles in the traveling direction, which is represented by the traveling direction signal 114, and calculates an average of the effective traveling speeds of all vehicles. Furthermore, the vehicle group average traveling speed calculation part 127 calculates a time average to obtain an average traveling speed of the group of vehicles in the traveling direction to output a vehicle group average traveling speed signal 128 in the traveling direction that indicates the average traveling speed of the group of vehicles in the traveling direction.

As shown in FIG. 4, the traffic condition determination part 129 compares the vehicle group average traveling speed signal 128 in the traveling direction with the traffic condition threshold values to determine traffic conditions in the traveling direction.

The advantageous effects of the first example of the present invention will be described below.

According to the first example of the present invention, with the existing cellular phone infrastructure, a traveling speed and a traveling direction of a vehicle moving (traveling) on a road can be calculated from a frequency shift of a mobile terminal of the vehicle. Thus, traffic conditions can be analyzed. Therefore, a low-cost, small-scale traffic condition monitoring system can be provided.

The speed/direction estimation part 2000 and the traffic condition analysis part 3000 can be implemented by a computer. As is known in the art, the computer includes a central processing unit (CPU), a storage device (RAM) for storing data, and a program memory (ROM) for storing programs. The storage device (RAM) serves as the frequency shift storage device 109 and the traveling speed storage device 125. The CPU reads the programs stored in the program memory (ROM) and implements functions of the speed/direction estimation part 2000 and the traffic condition analysis part 3000.

Example 2

Figure 5:
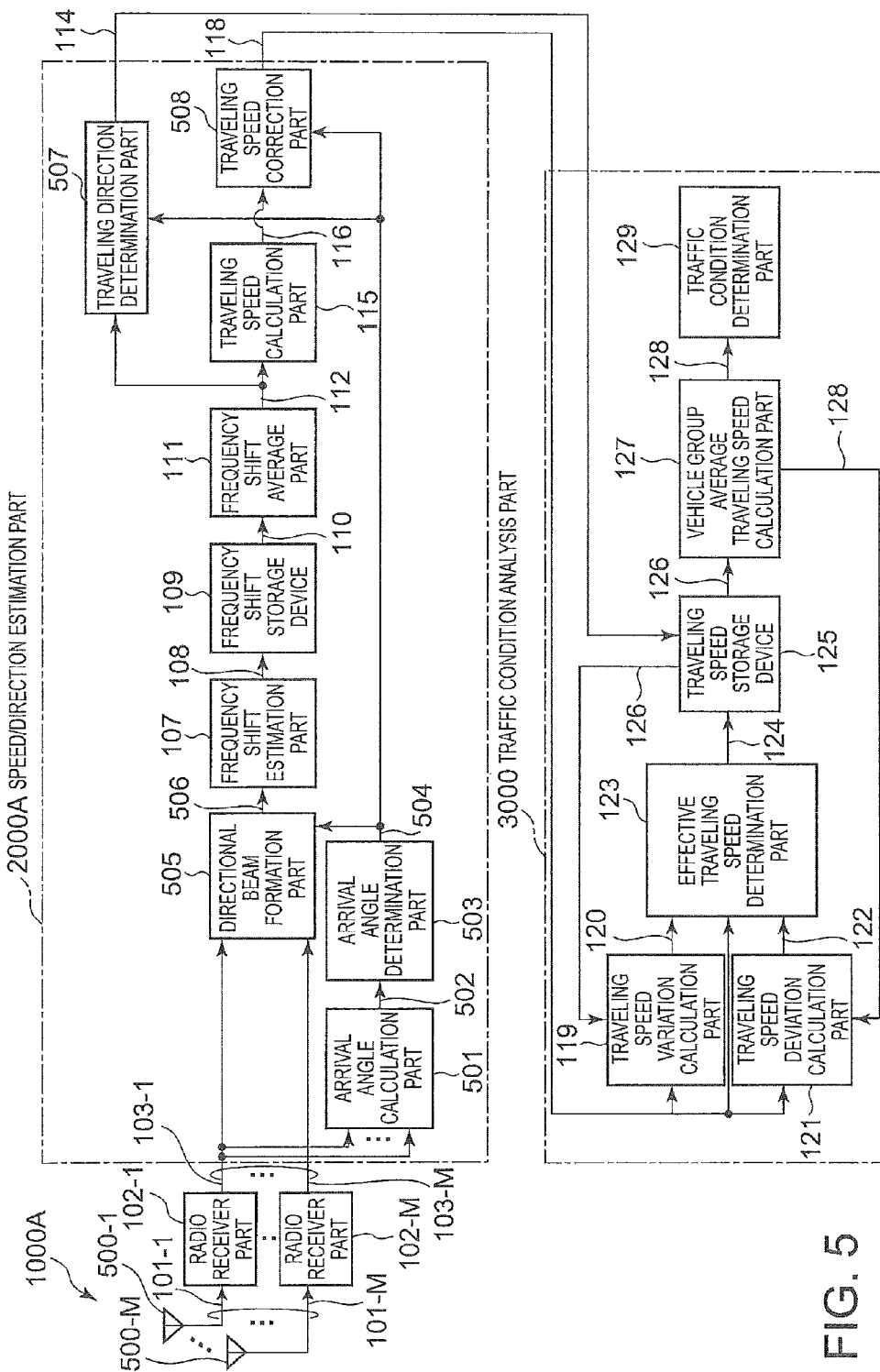
FIG. 5 is a block diagram showing a configuration of a traffic condition monitoring system according to a second example of the present invention.

Referring to FIG. 5, a traffic condition monitoring system according to a second example of the present invention will be described. The traffic condition monitoring system according to the second example calculates a traveling speed of a vehicle and determines a traveling direction of the vehicle by forming a directional beam and estimating a frequency shift. In the following description, components having the same function as those in the traffic condition monitoring system shown in FIG. 1 according to the first example of the present invention are denoted by the same reference numerals, and the explanation thereof is omitted herein for brevity. Thus, the following description focuses on differences from the traffic condition monitoring system shown in FIG. 1 according to the first example of the present invention.

The traffic condition monitoring system according to the second example differs in the following points from the traffic condition monitoring system according to the first example. Specifically, the first to Nth sector antennas 100-1 to 100-N have been changed into M antenna elements of first to Mth array antennas 500-1 to 500-M (where M is an integer not less than 2). The sector selection part 104 has been changed into an arrival angle calculation part 501, an arrival angle determination part 503, and a directional beam formation part 505. The traveling direction determination part 113 has been changed into a traveling direction determination part 507 operable to determine a traveling direction based upon an average frequency shift, which is represented by an average frequency shift signal 112, and a determined arrival angle, which is represented by an arrival angle signal 504. The traveling speed correction part 117 has been changed into a traveling speed correction part 508 operable to correct a relative traveling speed based upon the determined arrival angle, which is represented by the arrival angle signal 504. Thus, the receiver part is denoted by the reference numeral 1000A, and the speed/direction estimation part is denoted by the reference numeral 2000A.

For first to Mth baseband signals 103-1 to 103-M that have been received by the M antenna elements, the arrival angle calculation part 501 calculates the received power, for example, as an index of the reception quality for each mobile terminal, estimates an arrival angle having the best reception quality, and outputs an arrival angle signal 502 indicative of the estimated arrival angle to the arrival angle determination part 503. However, if the reception quality of the estimated arrival angle is less than the preset threshold value of the reception quality, then the arrival angle calculation part 501 discards the arrival angle signal 502 so that subsequent processes are not performed. Therefore, communication signals transmitted from distant mobile terminals that are not on a nearby road can be excluded.

The arrival angle determination part 503 determines whether or not the estimated arrival angle, which is represented by the arrival angle signal 502, corresponds to the direction of the road. If the arrival angle determination part 503 determines that the estimated arrival angle corresponds to the direction of the road, then it outputs an arrival angle signal 504 indicative of the determined arrival angle to the directional beam formation part 505, to the traveling direction determination part 507, and to the traveling speed correction part 508. On the other hand, if the arrival angle determination part 503 determines that the estimated arrival angle does not correspond to the direction of the road, then it discards the arrival angle signal 502, which indicates the estimated arrival angle, so that subsequent processes are not performed.

Specifically, a combination of the arrival angle calculation part 501 and the arrival angle determination part 503 serves as an arrival angle estimation/determination part operable to estimate and determine an arrival angle of a received signal having the best reception quality among the first to Mth baseband signals 103-1 to 103-M.

Figure 6:
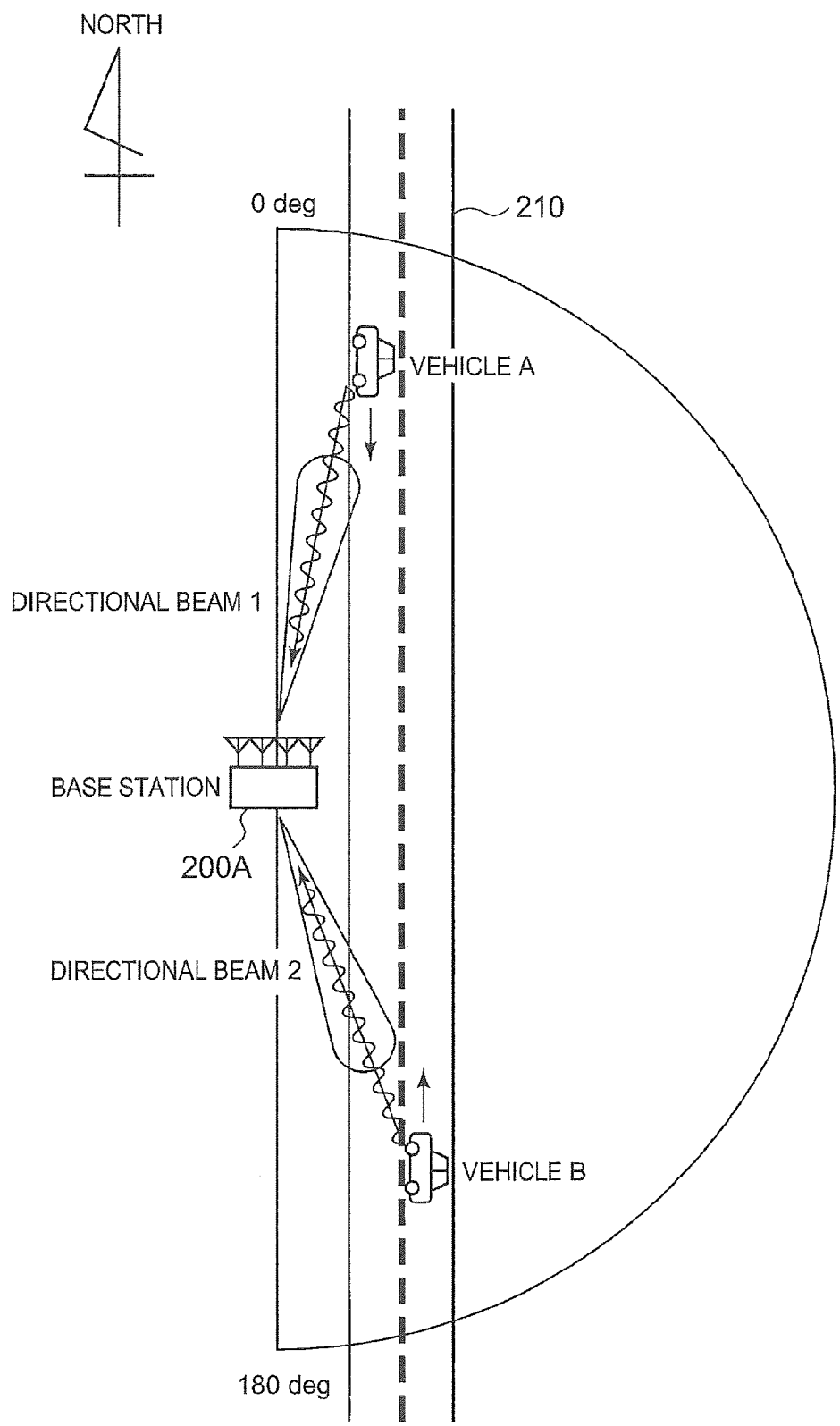
FIG. 6 is a schematic plan view explanatory of an operation of an arrival angle determination part used in the traffic condition monitoring system illustrated in FIG. 5, which shows the relationship between vehicles traveling on a road and directional beams of array antennas of a base station.

For example, as shown in FIG. 6, it is assumed that a base station 200A is arranged by the west side of a road 210 extending from north to south. A vehicle A is on the road 210 in the north of the base station 200A and is traveling southward on the road 210. A vehicle B is on the road 210 in the south of the base station 200A and is traveling northward on the road 210. In such a case, when the northern direction is defined as 0°, the arrival angle determination part 503 determines that arrival angles within a range of 0° to 180° correspond to the direction of the road and discards other arrival angles.

The directional beam formation part 505 forms a directional beam corresponding to the determined arrival angle, which is represented by the arrival angle signal 504 to output a baseband signal 506 after the formation of the directional beam. Unlike the case of the sector antennas, the directional beam can continuously track a vehicle. Therefore, determination of whether or not a received signal has been transmitted from a vehicle on the road 210 can be made with higher precision as compared to the first example.

The traveling direction determination part 507 determines the traveling direction of the vehicle based upon the polarity of a frequency shift, which is represented by the frequency shift signal 112, and the determined arrival angle, which is represented by the arrival angle signal 504. In the example of FIG. 6, the traveling direction determination part 507 determines that the vehicle A is moving (traveling) southward if the arrival angle is within a range of 0° to 90° like the vehicle A while the frequency shift is positive or if the arrival angle is within a range of 90° to 180° while the frequency shift is negative. On the other hand, the traveling direction determination part 507 determines that the vehicle B is moving (traveling) northward if the arrival angle is within a range of 0° to 90° while the frequency shift is negative or if the arrival angle is within a range of 90° to 180° like the vehicle B while the frequency shift is positive.

The traveling speed correction part 508 converts the determined arrival angle, which is represented by the arrival angle signal 504, into an angle (included angle) θ between a line connecting the vehicle to the base station 200A and the longitudinal direction of the road 210. The traveling speed correction part 508 substitutes θ for the following formula 6 to correct the relative traveling speed of the vehicle. Thus, the traveling speed correction part 508 calculates a corrected traveling speed to output a traveling speed signal 118 indicative of the traveling speed of the vehicle.

$$v = \frac{v'}{\cos\theta} \qquad \text{Formula 6}$$

Wherein, it is not necessary to approximate the included angle θ by using the included angle θ' unlike the first example. Therefore, the traveling speed of a vehicle can be corrected with higher precision.

Accordingly, in the second example, traffic conditions can be determined more accurately as compared to the first example.

The speed/direction estimation part 2000A and the traffic condition analysis part 3000 can be implemented by a computer. As is known in the art, the computer includes a central processing unit (CPU), a storage device (RAM) for storing data, and a program memory (ROM) for storing programs. The storage device (RAM) serves as the frequency shift storage device 109 and the traveling speed storage device 125. The CPU reads the programs stored in the program memory (ROM) and implements functions of the speed/direction estimation part 2000A and the traffic condition analysis part 3000.

Example 3

Figure 7:
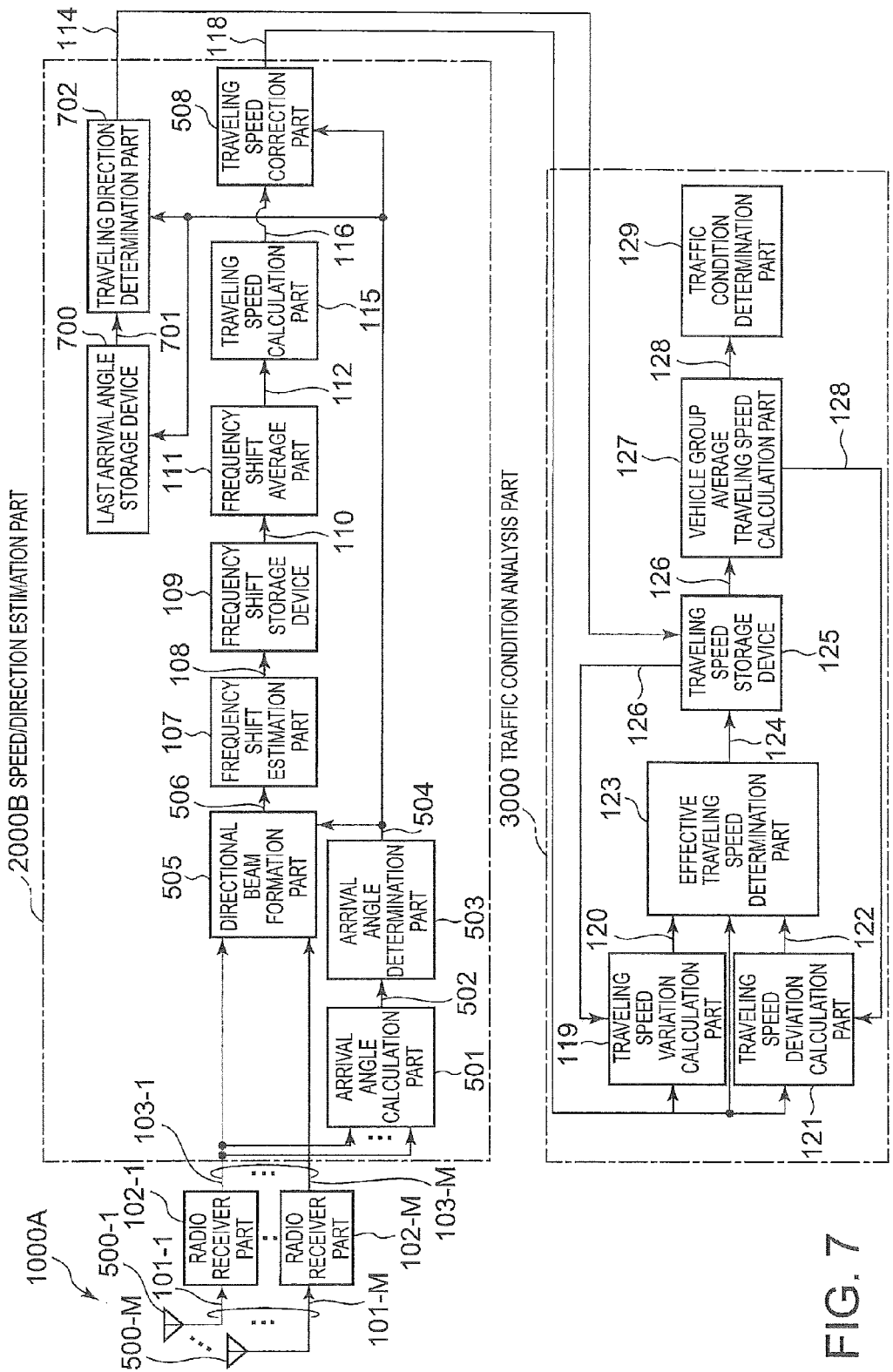
FIG. 7 is a block diagram showing a configuration of a traffic condition monitoring system according to a third example of the present invention.

Referring to FIG. 7, a traffic condition monitoring system according to a third embodiment of the present invention will be described. Components having the same function as those in the traffic condition monitoring system shown in FIG. 5 according to the second example of the present invention are denoted by the same reference numerals, and the explanation thereof is omitted herein for brevity. The following description focuses on differences from the traffic condition monitoring system shown in FIG. 5 according to the second example of the present invention.

The traffic condition monitoring system according to the third example differs in the following points from the traffic condition monitoring system according to the second example. A last arrival angle storage device 700 operable to store a current arrival angle signal 504 indicative of the current arrival angle to output a last arrival angle signal 701 indicative of the last arrival angle has been added in the traffic condition monitoring system according to the third example. The traveling direction determination part 507 has been replaced with a traveling direction determination part 702 operable to determine a traveling direction of a vehicle based upon the last determined arrival angle, which is represented by the last arrival angle signal 701, and the currently determined arrival angle, which is represented by the current arrival angle signal 504. Thus, the speed/direction estimation part is denoted by the reference numeral 2000B.

The traveling direction determination part 702 compares the last arrival angle, which is represented by the last arrival angle signal 701 read from the last arrival angle storage device 700, with the current arrival angle, which is represented by the current arrival angle signal 504, to determine a traveling direction of a vehicle. For example, in the example of FIG. 6, when the current arrival angle is greater than the last arrival angle, the traveling direction determination part 702 determines that the vehicle is traveling southward. In contrast, when the current arrival angle is smaller than the last arrival angle, the traveling direction determination part 702 determines that the vehicle is traveling northward.

Furthermore, after the traveling direction determination part 702 reads the last arrival angle signal 701 from the last arrival angle storage device 700, it stores the current arrival angle signal 504 in the last arrival angle storage device 700 for the next determination.

According to the third example, a traveling direction of a vehicle can be determined by changes of the determined arrival angle instead of the frequency shift.

The speed/direction estimation part 2000B and the traffic condition analysis part 3000 can be implemented by a computer. As is known in the art, the computer includes a central processing unit (CPU), a storage device (RAM) for storing data, and a program memory (ROM) for storing programs. The storage device (RAM) serves as the frequency shift storage device 109, the last arrival angle storage device 700, and the traveling speed storage device 125. The CPU reads the programs stored in the program memory (ROM) and implements functions of the speed/direction estimation part 2000B and the traffic condition analysis part 3000.

Example 4

Figure 8:
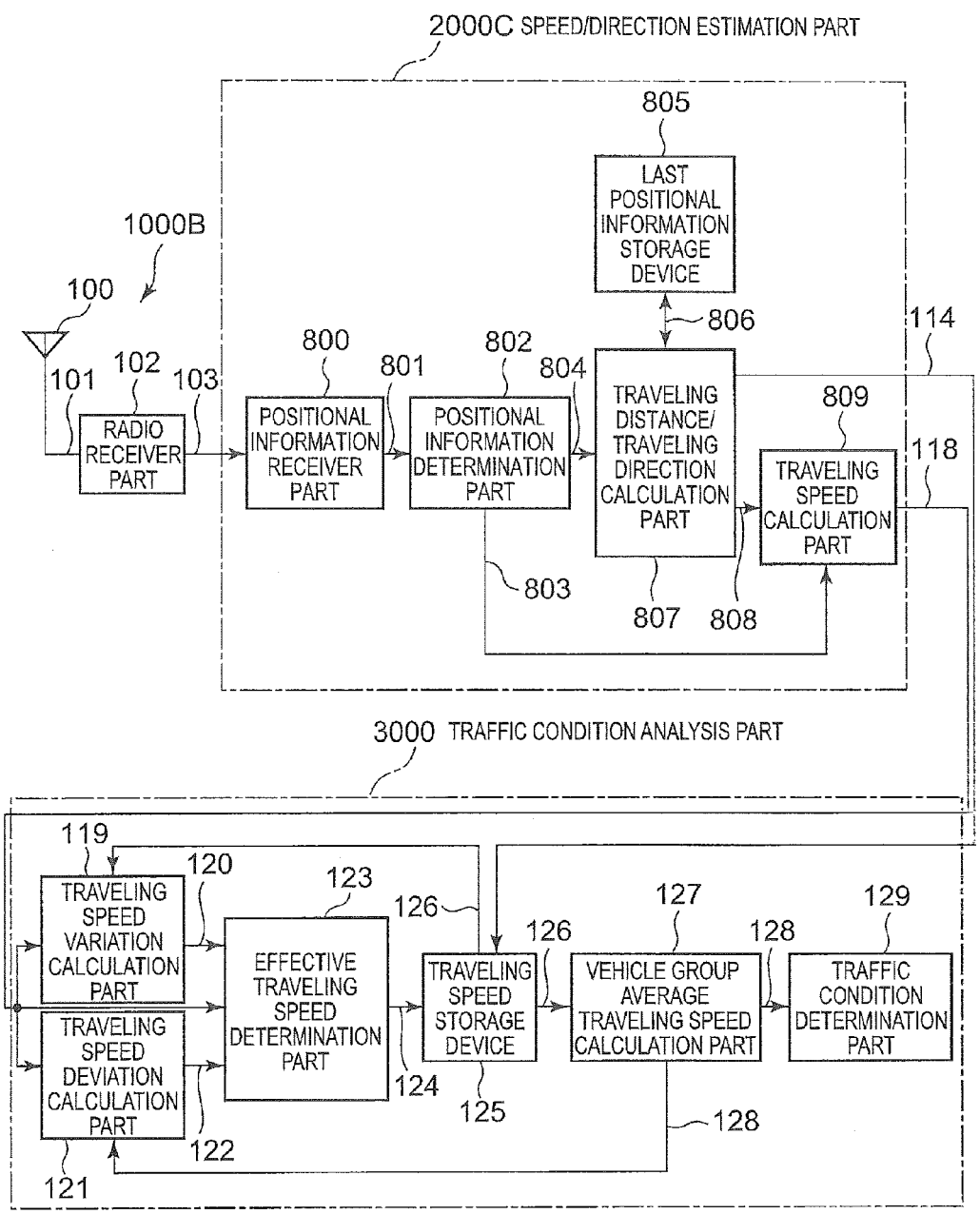
FIG. 8 is a block diagram showing a configuration of a traffic condition monitoring system according to a fourth example of the present invention.

Referring to FIG. 8, a traffic condition monitoring system according to a fourth example of the present invention will be described. The traffic condition monitoring system according to the fourth example periodically receives positional information, which has been obtained with a positional measurement function such as a GPS (Global Positioning System) mounted on a mobile terminal of a vehicle, at a base station 200B (see FIG. 9) to calculate a traveling speed and a traveling direction of a vehicle. Components having the same function as those in the traffic condition monitoring system shown in FIG. 1 according to the first example of the present invention are denoted by the same reference numerals, and the explanation thereof is omitted herein for brevity. The following description focuses on differences from the traffic condition monitoring system shown in FIG. 1 according to the first example of the present invention.

The traffic condition monitoring system according to the fourth example differs in the following points from the traffic condition monitoring system according to the first example. A processing part (speed/direction estimation part) 2000 relating to selection of a sector and calculation of a traveling speed with estimation of a frequency shift has been changed to a processing part (speed/direction estimation part) 2000C using positional information. No traveling speed correction part 117 is required in the traffic condition monitoring system according to the fourth example. Furthermore, unlike the traffic condition monitoring systems according to the first and second examples, the configuration of the antenna 100 is not limited to a specific one in the traffic condition monitoring system according to the fourth example.

The speed/direction estimation part 2000C includes a positional information receiver part 800, a positional information determination part 802, a traveling distance/traveling direction calculation part 807, a last positional information storage device 805, and a traveling speed calculation part 809.

The positional information receiver part 800 calculates, for example, a received power as an index of the reception quality for each mobile terminal. If the calculated reception quality is not less than a preset threshold value of the reception quality, then the positional information receiver part 800 extracts positional terminal information 801 from the baseband signal (received signal) 103 for each mobile terminal to output the positional terminal information 801. If the calculated reception quality is less than the threshold value, then the positional information receiver part 800 discards the received signal 103 so that subsequent processes are not performed. Thus, the reliability of the positional information data can be enhanced.

Specifically, the positional information receiver part 800 calculates the reception quality of a received signal (baseband signal output by the radio receiver part 102) 103 for each mobile terminal, extracts positional terminal information 801 indicative of the position of the mobile terminal from the received signal having a reception quality higher than the preset reception quality to output the positional terminal information.

The positional information determination part 802 compares the preset positional information of the road 210 with the positional terminal information 801 of the mobile terminal. If the position of the mobile terminal matches with any position on the road 210 (FIG. 9), then the positional information determination part 802 outputs current vehicle positional information 804 and also transmits a positional information reception cycle 803 to the traveling speed calculation part 809. If the position of the mobile terminal does not matches with any position on the road 210 (FIG. 9), then the positional information determination part 802 discards the positional terminal information 801 so that subsequent processes are not performed.

In other words, the positional information determination part 802 compares the preset positional information of the road 210 with the positional terminal information 801 to output current vehicle positional information 804 and a positional information reception cycle 803 when the position of the mobile terminal matches with any position on the road 201.

Therefore, a combination of the positional information receiver part 800 and the positional information determination part 802 serves as a positional information identification part operable to identify a current vehicle position on the road 201 from communication signals including the positional information to output current vehicle positional information 804 indicative of the current vehicle position and a positional information reception cycle 803.

The last positional information storage device 805 stores the current vehicle positional information 804 to output last vehicle positional information 806 indicative of the last vehicle position.

The traveling distance/traveling direction calculation part 807 reads the last vehicle positional information 806 from the last positional information storage device 805, calculates a traveling distance of each vehicle and a traveling direction of each vehicle from the last vehicle position, which is represented by the last vehicle positional information 806, and the current vehicle position, which is represented by the current vehicle positional information 804 to output a traveling distance signal 808 indicative of the traveling distance of each vehicle and a traveling direction signal 114 indicative of the traveling direction of each vehicle, and stores the current vehicle positional information 804 in the last positional information storage device 805 for the next calculation.

Figure 9:
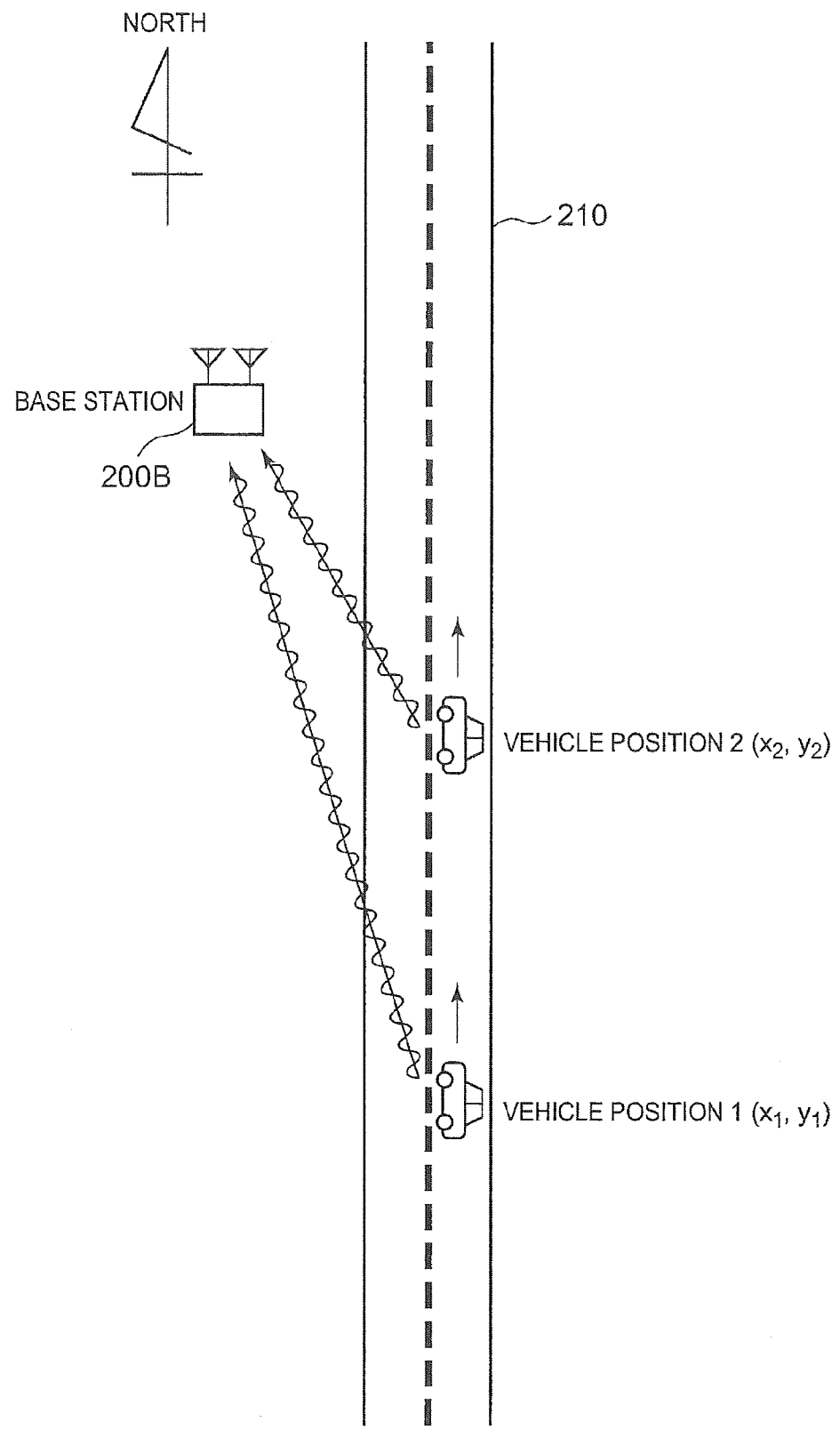
FIG. 9 is a schematic plan view explanatory of an operation of calculating a traveling distance with a traveling distance/traveling direction calculation part used in the traffic condition monitoring system illustrated in FIG. 8, which shows the relationship between vehicles traveling on a road and a base station.

In the example of FIG. 9, a base station 200B is arranged by the west side of a road 210 extending from north to south. A vehicle located on the south side of the base station 200B is traveling northward on the road 210 so as to approach the base station 200B. In this example, when the vehicle moves from the last vehicle position 1 ($x_1$, $y_1$) to the current vehicle position 2 ($x_2$, $y_2$), the traveling distance D can be calculated by the following formula 7.

$$D=\sqrt{(x_2-x_1)^2+(y_2-y_1)^2} \qquad \text{Formula 7}$$

In this formula, $x_1$ and $x_2$ are position coordinates in the east-west direction, and $y_1$ and $y_2$ are position coordinates in the north-south direction.

If an angle with respect to the north-south direction is defined as $\varphi$, the traveling direction of a vehicle can be calculated by the following formula 8.

$$\phi = \tan^{-1}\left(\frac{x_2-x_1}{y_2-y_1}\right) \qquad \text{Formula 8}$$

The traveling speed calculation part 809 calculates a traveling speed of each vehicle with use of the traveling distance, which is represented by the traveling distance signal 808, and a positional information reception cycle 803 as shown by the following formula 9 and outputs a traveling speed signal 118 indicative of the traveling speed of each vehicle to a subsequent stage. Wherein, the traveling speed is defined as v, the traveling distance is defined as D, and the positional information reception cycle is defined as T.

$$v=D/T \qquad \text{Formula 9}$$

Since the traffic condition monitoring system according to the fourth example can identify the position of a vehicle, it is not necessary to correct the traveling speed with use of angular information unlike the traffic condition monitoring systems according to the first to third examples. In the traffic condition monitoring systems according to the first to third examples, signals transmitted from the mobile terminals located relatively near the base station and in the same direction as the road but not on the road cannot be excluded completely. In contrast, the traffic condition monitoring system according to the fourth example can identify signals from vehicles on the road with reference to the positional information of the road. Therefore, the traveling speed and the traveling direction of vehicles can be estimated with higher accuracy. Accordingly, the traffic condition monitoring system according to the fourth example can determine traffic conditions more accurately as compared to the traffic condition monitoring systems according to the first to third examples.

The fourth example of the present invention employs the existing cellular phone infrastructure, can calculate a traveling speed and a traveling direction of a vehicle from a communication signal including positional information that is periodically transmitted from a mobile terminal of a vehicle traveling on a road, and can analyze traffic conditions of each traveling direction. Therefore, a low-cost, small-scale traffic condition monitoring system can be provided.

The speed/direction estimation part 2000C and the traffic condition analysis part 3000 can be implemented by a computer. As is known in the art, the computer includes a central processing unit (CPU), a storage device (RAM) for storing data, and a program memory (ROM) for storing programs. The storage device (RAM) serves as the last positional information storage device 805 and the traveling speed storage device 125. The CPU reads the programs stored in the program memory (ROM) and implements functions of the speed/direction estimation part 2000C and the traffic condition analysis part 3000.

While the present invention has been particularly shown and described with reference to examples thereof, the present invention is not limited to the aforementioned examples. It will be understood by those of ordinary skill in the art that various modifications in form and details may be made therein without departing from the sprit and scope of the present invention as defined by the claims. Furthermore, the present invention is not limited to use of the cellular phone infrastructure, which has been assumed in the above examples. The present invention is applicable to communication systems having any communication form.

The whole or part of the exemplary embodiments disclosed above can be described as, but not limited to, the following supplementary notes.

(Supplementary note 1) A traffic condition monitoring system provided in a base station installed by a side of a road for monitoring a traffic condition based upon communication signals transmitted from mobile terminals in a plurality of vehicles traveling on the road, the system comprising:

a receiver part operable to receive the communication signals transmitted from the mobile terminals of the respective vehicles to output received signals;

a speed/direction estimation part operable to estimate traveling speeds and traveling directions of the respective vehicles based upon the received signals; and a traffic condition analysis part operable to determine effective traveling speeds of the respective vehicles in each traveling direction, to calculate an average traveling speed of a group of vehicles in each traveling direction, and to analyze a traffic condition in each traveling direction based upon the average traveling speed of the group of vehicles in each traveling direction.

(Supplementary note 2) The traffic condition monitoring system as recited in Supplementary note 1, wherein the receiver part includes:

first to Nth sector antennas disposed for N sectors where N is an integer not less than 2; and first to Nth radio receiver parts operable to convert first to Nth radio signals received by the first to Nth sector antennas into first to Nth baseband signals to output the first to Nth baseband signals as the received signals, wherein the speed/direction estimation part includes:

a sector selection part operable to select a sector in which the received signal has the best reception quality from among the first to Nth baseband signals to output the received signals of the selected sector and a selected sector number;

a frequency shift calculation part operable to estimate frequency shifts from the received signals of the selected sector and to calculate an average frequency shift by averaging the frequency shifts;

a traveling direction determination part operable to determine a traveling direction of the vehicle from the selected sector number and the average frequency shift;

a traveling speed calculation part operable to calculate a relative traveling speed of the vehicle with respect to the base station from the average frequency shift; and a traveling speed correction part operable to correct the relative traveling speed of the vehicle based upon the selected sector number to calculate a traveling speed of the vehicle.

(Supplementary note 3)

The traffic condition monitoring system as recited in Supplementary note 2, wherein the frequency shift calculation part includes:

a frequency shift estimation part operable to estimate frequency shifts from the received signals of the selected sector in a continuous manner;

a frequency shift storage device operable to store frequency shift signals indicative of the estimated frequency shifts in a continuous manner; and a frequency shift average part operable to read the frequency shift signals stored for each average period from the frequency shift storage device and to calculate the average frequency shift.

(Supplementary note 4) The traffic condition monitoring system as recited in Supplementary note 1, wherein the receiver part includes:

first to Mth array antennas including M antenna elements where M is an integer not less than 2; and first to Mth radio receiver parts operable to convert first to Mth radio signals received by the first to Mth array antennas into first to Mth baseband signals and to output the first to Mth baseband signals as the received signals, wherein the speed/direction estimation part includes:

an arrival angle estimation/determination part operable to estimate and determine arrival angles of the received signals each having the best reception quality from among the first to Mth baseband signals;

a directional beam formation part operable to form directional beams corresponding to the determined arrival angles and to output baseband signals after the formation of the directional beams;

a frequency shift calculation part operable to estimate frequency shifts from the baseband signals after the formation of the directional beam and to calculate an average frequency shift by averaging the frequency shifts;

a traveling direction determination part operable to determine a traveling direction of the vehicle from the arrival angle and the average frequency shift;

a traveling speed calculation part operable to calculate a relative traveling speed of the vehicle with respect to the base station from the average frequency shift; and a traveling speed correction part operable to correct the relative traveling speed of the vehicle based upon the arrival angle to calculate a traveling speed of the vehicle.

(Supplementary note 5) A traffic condition monitoring system as recited in Supplementary note 4, wherein the arrival angle estimation/determination part includes:

an arrival angle calculation part operable to estimate an arrival angle of the received signal having the best reception quality for each mobile terminal from among the first to Mth baseband signals; and an arrival angle determination part operable to determine whether or not the estimated arrival angle corresponds to a direction of the road and to output an arrival angle signal indicative of the determined arrival angle when it determines that the estimated arrival angle corresponds to the direction of the road.

(Supplementary note 6) The traffic condition monitoring system as recited in Supplementary note 4 or 5, wherein the frequency shift calculation part includes:

a frequency shift estimation part operable to estimate frequency shifts in a continuous manner from baseband signals after the formation of the directional beam;

a frequency shift storage device operable to store frequency shift signal indicative of the estimated frequency shifts in a continuous manner; and a frequency shift average part operable to read the frequency shift signals stored for each average period from the frequency shift storage device and to calculate the average frequency shift.

(Supplementary note 7) The traffic condition monitoring system as recited in Supplementary note 1, wherein the receiver part includes:

first to Mth array antennas including M antenna elements where M is an integer not less than 2; and first to Mth radio receiver parts operable to convert first to Mth radio signals received by the first to Mth array antennas into first to Mth baseband signals to output the first to Mth baseband signals as the received signals, wherein the speed/direction estimation part includes:

an arrival angle estimation/determination part operable to estimate and determine current arrival angles of the received signals each having the best reception quality from among the first to Mth baseband signals;

a directional beam formation part operable to form directional beams corresponding to the current arrival angles to output baseband signals after the formation of the directional beams;

a frequency shift calculation part operable to estimate frequency shifts from the baseband signals after the formation of the directional beams and to calculate an average frequency shift by averaging the frequency shifts;

a last arrival angle storage device operable to store a current arrival angle signal indicative of the current arrival angle to output a last arrival angle signal indicative of a last arrival angle;

a traveling direction determination part operable to determine a traveling direction of the vehicle from the last arrival angle and the current arrival angle;

a traveling speed calculation part operable to calculate a relative traveling speed of the vehicle with respect to the base station from the average frequency shift; and a traveling speed correction part operable to correct the relative traveling speed of the vehicle based upon the current arrival angle to calculate a traveling speed of the vehicle.

(Supplementary note 8) The traffic condition monitoring system as recited in Supplementary note 7, wherein the arrival angle estimation/determination part includes:

an arrival angle calculation part operable to estimate a current arrival angle of the received signal having the best reception quality for each mobile terminal from among the first to Mth baseband signals; and an arrival angle determination part operable to determine whether or not the estimated current arrival angle corresponds to a direction of the road to output a current arrival angle signal indicative of the current arrival angle when it determines that the estimated current arrival angle corresponds to the direction of the road.

(Supplementary note 9) The traffic condition monitoring system as recited in Supplementary note 7 or 8, wherein the frequency shift calculation part includes:

a frequency shift estimation part operable to estimate frequency shifts in a continuous manner from baseband signals after the formation of the directional beams;

a frequency shift storage device operable to store frequency shift signals indicative of the estimated frequency shifts in a continuous manner; and a frequency shift average part operable to read the frequency shift signals stored for each average period from the frequency shift storage device and to calculate the average frequency shift.

(Supplementary note 10) The traffic condition monitoring system as recited in Supplementary note 1, wherein the receiver part periodically receives, as the communication signals, signals including positional information from the mobile terminals in the respective vehicles to output the received signals, wherein the speed/direction estimation part includes:

a positional information identification part operable to identify a current vehicle position on the road from the signal including the positional information to output current vehicle positional information indicative of the current vehicle position and a positional information reception cycle, a last positional information storage device operable to store the current vehicle positional information to output last vehicle positional information indicative of a last vehicle position;

a traveling distance/traveling direction calculation part operable to calculate a traveling distance of each vehicle and a traveling direction of each vehicle from the last vehicle position and the current vehicle position; and a traveling speed calculation part operable to calculate a traveling speed of each vehicle with use of the traveling distance and the positional information reception cycle.

(Supplementary note 11) The traffic condition monitoring system as recited in Supplementary note 10, wherein the positional information identification part includes:

a positional information receiver part operable to calculate a reception quality of received signal for each mobile terminal, to extract positional terminal information indicative of a position of the mobile terminal from the received signals having a reception quality higher than a preset value, and to output the positional terminal information; and a positional information determination part operable to compare preset positional information of the road with the positional terminal information to output the current vehicle positional information and the positional information reception cycle when the position of the mobile terminal matches with any position of the road.

(Supplementary note 12) The traffic condition monitoring system as recited in any one of Supplementary notes 1 to 11, wherein the traffic condition analysis part includes:

an effective speed determination part operable to determine whether or not a current traveling speed of each vehicle is effective to output an effective traveling speed signal indicative of the effective traveling speed;

a traveling speed storage device operable to store the effective traveling speed signal of each vehicle in each traveling direction;

a vehicle group average traveling speed calculation part operable to read the effective traveling speed signals of all vehicles in each traveling direction from the traveling speed storage device, and to calculate an average of the effective traveling speeds of all vehicles to obtain the average traveling speed of the group of vehicles in each traveling direction; and a traffic condition determination part operable to determine the traffic condition in each traveling direction based upon the average traveling speed of the group of vehicles in each traveling direction.

(Supplementary note 13) The traffic condition monitoring system as recited in Supplementary note 12, wherein the effective speed determination part includes:

a traveling speed variation calculation part operable to read an effective traveling speed signal of the vehicle that was calculated last time, as a last traveling speed signal indicative of the last traveling speed, from the traveling speed storage device and to calculate a variation of the current traveling speed of the vehicle with respect to the last traveling speed;

a traveling speed deviation calculation part operable to calculate a deviation of the current traveling speed of the vehicle with respect to the average traveling speed of the group of vehicles in each traveling direction; and an effective traveling speed determination part operable to determine whether or not the current traveling speed of the vehicle is effective based upon the variation and the deviation to output the effective traveling speed signal.

(Supplementary note 14) The traffic condition monitoring system as recited in Supplementary note 12 or 13, wherein the traffic condition determination part is operable to determine the traffic condition in each traveling direction from among a smooth condition, a spontaneously congested condition, a spontaneously jammed condition, a congested condition by accident, and a jammed condition by accident, based upon the average traveling speed of the group of vehicles in each traveling direction, a congestion threshold value, a jam threshold value, and accident occurrence information.

(Supplementary note 15) A traffic condition monitoring method used in a traffic condition monitoring system provided in a base station installed by a side of a road, for monitoring a traffic condition based upon communication signals transmitted from mobile terminals in a plurality of vehicles traveling on the road, the method comprising:

a speed/direction estimation step of estimating traveling speeds and traveling directions of the respective vehicles based upon received signals of a receiver part that has received the communication signals transmitted from the mobile terminals in the vehicles; and a traffic condition analysis step of determining effective traveling speeds of the respective vehicles in each traveling direction, of calculating an average traveling speed of a group of vehicles in each traveling direction, and of analyzing a traffic condition in each traveling direction based upon the average traveling speed of the group of vehicles in each traveling direction.

(Supplementary note 16) The traffic condition monitoring method as recited in Supplementary note 15, wherein the receiver part includes first to Nth sector antennas disposed for N sectors where N is an integer not less than 2, and first to Nth radio receiver parts operable to convert first to Nth radio signals received by the first to Nth sector antennas into first to Nth baseband signals to output the first to Nth baseband signals as the received signals, wherein the speed/direction estimation step includes:

a sector selection step of selecting a sector in which the received signal has the best reception quality from among the first to Nth baseband signals and outputting the received signals of the selected sector and a selected sector number;

a frequency shift calculation step of estimating frequency shifts from the received signals of the selected sector and of calculating an average frequency shift by averaging the frequency shifts;

a traveling direction determination step of determining a traveling direction of the vehicle from the selected sector number and the average frequency shift;

a traveling speed calculation step of calculating a relative traveling speed of the vehicle with respect to the base station from the average frequency shift; and a traveling speed correction step of correcting the relative traveling speed of the vehicle based upon the selected sector number to calculate a traveling speed of the vehicle.

(Supplementary note 17) The traffic condition monitoring method as recited in Supplementary note 16, wherein the frequency shift calculation step includes:

a frequency shift estimation step of estimating frequency shifts from the received signals of the selected sector in a continuous manner;

a step of storing frequency shift signals indicative of the estimated frequency shifts in a frequency shift storage device in a continuous manner; and a frequency shift averaging step of reading the frequency shifts stored for each average period from the frequency shift storage device and of calculating the average frequency shift.

(Supplementary note 18) The traffic condition monitoring method as recited in Supplementary note 15, wherein the receiver part includes first to Mth array antennas including M antenna elements where M is an integer not less than 2, and first to Mth radio receiver parts operable to convert first to Mth radio signals received by the first to Mth array antennas into first to Mth baseband signals to output the first to Mth baseband signals as the received signals, wherein the speed/direction estimation step includes:

an arrival angle estimation/determination step of estimating and determining arrival angles of the received signals each having the best reception quality from among the first to Mth baseband signals, a directional beam formation step of forming directional beams corresponding to the determined arrival angles and of producing baseband signals after the formation of the directional beams;

a frequency shift calculation step of estimating frequency shifts from the baseband signals after the formation of the directional beams and of calculating an average frequency shift by averaging the frequency shifts;

a traveling direction determination step of determining a traveling direction of the vehicle from the arrival angle and the average frequency shift;

a traveling speed calculation step of calculating a relative traveling speed of the vehicle with respect to the base station from the average frequency shift, and a traveling speed correction step of correcting the relative traveling speed of the vehicle based upon the arrival angle to calculate a traveling speed of the vehicle.

(Supplementary note 19) The traffic condition monitoring method as recited in Supplementary note 18, wherein the arrival angle estimation/determination step includes:

an arrival angle calculation step of estimating an arrival angle of the received signal having the best reception quality for each mobile terminal from among the first to Mth baseband signals; and an arrival angle determination step of determining whether or not the estimated arrival angle corresponds to a direction of the road and of producing an arrival angle signal indicative of the determined arrival angle when it determines that the estimated arrival angle corresponds to the direction of the road.

(Supplementary note 20) The traffic condition monitoring method as recited in Supplementary note 18 or 19, wherein the frequency shift calculation step includes:

a frequency shift estimation step of estimating frequency shifts in a continuous manner from baseband signals after the formation of the directional beam;

a step of storing frequency shift signals indicative of the estimated frequency shifts in a frequency shift storage device in a continuous manner; and a frequency shift averaging step of reading the frequency shift signals stored for each average period from the frequency shift storage device and of calculating the average frequency shift.

(Supplementary note 21) The traffic condition monitoring method as recited in Supplementary Note 15, wherein the receiver part includes first to Mth array antennas including M antenna elements where M is an integer not less than 2, and first to Mth radio receiver parts operable to convert first to Mth radio signals received by the first to Mth array antennas into first to Mth baseband signals to output the first to Mth baseband signals as the received signals, wherein the speed/direction estimation step includes:

an arrival angle estimation/determination step of estimating and determining current arrival angles of the received signals each having the best reception quality from among the first to Mth baseband signals;

a directional beam formation step of forming directional beams corresponding to the current arrival angles to output baseband signals after the formation of the directional beams;

a frequency shift calculation step of estimating frequency shifts from the baseband signals after the formation of the directional beams and of calculating an average frequency shift by averaging the frequency shifts;

a step of storing a current arrival angle signal indicative of the current arrival angle in a last arrival angle storage device to output a last arrival angle signal indicative of a last arrival angle from the last arrival angle storage device;

a traveling direction determination step of determining a traveling direction of the vehicle from the last arrival angle and the current arrival angle;

a traveling speed calculation step of calculating a relative traveling speed of the vehicle with respect to the base station from the average frequency shift; and a traveling speed correction step of correcting the relative traveling speed of the vehicle based upon the current arrival angle to calculate a traveling speed of the vehicle.

(Supplementary note 22) The traffic condition monitoring method as recited in Supplementary note 21, wherein the arrival angle estimation/determination step includes:

an arrival angle calculation step of estimating a current arrival angle of the received signal having the best reception quality for each mobile terminal from among the first to Mth baseband signals; and an arrival angle determination step of determining whether or not the estimated current arrival angle corresponds to a direction of the road to output a current arrival angle signal indicative of the current arrival angle when it determines that the estimated current arrival angle corresponds to the direction of the road.

(Supplementary note 23) The traffic condition monitoring method as recited in Supplementary note 21 or 22, wherein the frequency shift calculation step includes:

a frequency shift estimation step of estimating frequency shifts in a continuous manner from baseband signals after the formation of the directional beams;

a step of storing frequency shift signals indicative of the estimated frequency shifts in a frequency shift storage device in a continuous manner; and a frequency shift averaging step of reading the frequency shift signals stored for each average period from the frequency shift storage device and of calculating the average frequency shift.

(Supplementary note 24) The traffic condition monitoring method as recited in Supplementary note 15, wherein the receiver part periodically receives, as the communication signals, signals including positional information from the mobile terminals in the respective vehicles to output the received signals, wherein the speed/direction estimation step includes:

a positional information identification step of identifying a current vehicle position on the road from the signal including the positional information to output current vehicle positional information indicative of the current vehicle position and a positional information reception cycle;

a step of storing the current vehicle positional information in a last positional information storage device to output last vehicle positional information indicative of a last vehicle position from the last positional information storage device;

a traveling distance/traveling direction calculation step of calculating a traveling distance of each vehicle and a traveling direction of each vehicle from the last vehicle position and the current vehicle position; and a traveling speed calculation step of calculating a traveling speed of each vehicle with use of the traveling distance and the positional information reception cycle.

(Supplementary note 25) The traffic condition monitoring method as recited in Supplementary note 24, wherein the positional information identification step includes:

a positional information receiver step of calculating a reception quality of the received signal for each mobile terminal, of extracting positional terminal information indicative of a position of the mobile terminal from the received signals having a reception quality higher than a preset value, and of producing the positional terminal information; and a positional information determination step of comparing preset positional information of the road with the positional terminal information to output the current vehicle positional information and the positional information reception cycle when the position of the mobile terminal matches with any position of the road.

(Supplementary note 26) The traffic condition monitoring method as recited in any one of Supplementary notes 15 to 25, wherein the traffic condition analysis step includes:

an effective speed determination step of determining whether or not a current traveling speed of each vehicle is effective to output an effective traveling speed signal indicative of the effective traveling speed;

a step of storing the effective traveling speed signal of each vehicle in each traveling direction in a traveling speed storage device;

a vehicle group average speed calculation step of reading the effective traveling speed signals of all vehicles in each traveling direction from the traveling speed storage device and of calculating an average of the effective traveling speeds of all vehicles to obtain the average traveling speed of the group of vehicles in each traveling direction; and a traffic condition determination step of determining the traffic condition in each traveling direction based upon the average traveling speed of the group of vehicles in each traveling direction.

(Supplementary note 27) The traffic condition monitoring method as recited in Supplementary note 26, wherein the effective speed determination step includes:

a traveling speed variation calculation step of reading an effective traveling speed signal of the vehicle that was calculated last time, as a last traveling speed signal indicative of the last traveling speed, from the traveling speed storage device and of calculating a variation of the current traveling speed of the vehicle with respect to the last traveling speed;

a traveling speed deviation calculation step of calculating a deviation of the current traveling speed of the vehicle with respect to the average traveling speed of the group of vehicles in each traveling direction; and an effective traveling speed determination step of determining whether or not the current traveling speed of the vehicle is effective based upon the variation and the deviation to output the effective traveling speed signal.

(Supplementary note 28) The traffic condition monitoring method as recited in Supplementary note 26 or 27, wherein the traffic condition determination step includes determining the traffic condition in each traveling direction from among a smooth condition, a spontaneously congested condition, a spontaneously jammed condition, a congested condition by accident, and a jammed condition by accident, based upon the average traveling speed of the group of vehicles in each traveling direction, a congestion threshold value, a jam threshold value, and accident occurrence information.

(Supplementary note 29) A computer-readable storage medium having a program recorded thereon for allowing a computer of a traffic condition monitoring system provided in a base station installed by a side of a road to monitor a traffic condition based upon communication signals transmitted from mobile terminals in a plurality of vehicles traveling on the road, the program causing the computer to implement:

a speed/direction estimation function of estimating traveling speeds and traveling directions of the respective vehicles based upon received signals of a receiver part that has received the communication signals transmitted from the mobile terminals in the vehicles; and a traffic condition analysis function of determining effective traveling speeds of the respective vehicles in each traveling direction, of calculating an average traveling speed of a group of vehicles in each traveling direction, and of analyzing a traffic condition in each traveling direction based upon the average traveling speed of the group of vehicles in each traveling direction.

(Supplementary note 30) The computer-readable storage medium as recited in Supplementary note 29, wherein the receiver part includes first to Nth sector antennas disposed for N sectors where N is an integer not less than 2, and first to Nth radio receiver parts operable to convert first to Nth radio signals received by the first to Nth sector antennas into first to Nth baseband signals to output the first to Nth baseband signals as the received signals, wherein the speed/direction estimation function causes the computer to implement:

a sector selection function of selecting a sector in which the received signal has the best reception quality from among the first to Nth baseband signals to output the received signals of the selected sector and a selected sector number;

a frequency shift calculation function of estimating frequency shifts from the received signals of the selected sector and of calculating an average frequency shift by averaging the frequency shifts;

a traveling direction determination function of determining a traveling direction of the vehicle from the selected sector number and the average frequency shift;

a traveling speed calculation function of calculating a relative traveling speed of the vehicle with respect to the base station from the average frequency shift; and a traveling speed correction function of correcting the relative traveling speed of the vehicle based upon the selected sector number to calculate a traveling speed of the vehicle.

(Supplementary note 31) The computer-readable storage medium as recited in Supplementary note 30, wherein the frequency shift calculation function causes the computer to implement:

a frequency shift estimation function of estimating frequency shifts from the received signals of the selected sector in a continuous manner;

a function of storing frequency shift signals indicative of the estimated frequency shifts in a frequency shift storage device in a continuous manner; and a frequency shift averaging function of reading the frequency shifts stored for each average period from the frequency shift storage device and of calculating the average frequency shift.

(Supplementary note 32) The computer-readable storage medium as recited in Supplementary note 29, wherein the receiver part includes first to Mth array antennas including M antenna elements where M is an integer not less than 2, and first to Mth radio receiver parts operable to convert first to Mth radio signals received by the first to Mth array antennas into first to Mth baseband signals to output the first to Mth baseband signals as the received signals, wherein the speed/direction estimation function causes the computer to implement:

an arrival angle estimation/determination function of estimating and determining arrival angles of the received signals each having the best reception quality from among the first to Mth baseband signals, a directional beam formation function of forming directional beams corresponding to the determined arrival angles and of producing baseband signals after the formation of the directional beams;

a frequency shift calculation function of estimating frequency shifts from the baseband signals after the formation of the directional beam and of calculating an average frequency shift by averaging the frequency shifts;

a traveling direction determination function of determining a traveling direction of the vehicle from the arrival angle and the average frequency shift;

a traveling speed calculation function of calculating a relative traveling speed of the vehicle with respect to the base station from the average frequency shift; and a traveling speed correction function of correcting the relative traveling speed of the vehicle based upon the arrival angle to calculate a traveling speed of the vehicle.

(Supplementary note 33) The computer-readable storage medium as recited in Supplementary note 32, wherein the arrival angle estimation/determination function causes the computer to implement:

an arrival angle calculation function of estimating an arrival angle of the received signal having the best reception quality for each mobile terminal from among the first to Mth baseband signals; and an arrival angle determination function of determining whether or not the estimated arrival angle corresponds to a direction of the road and of producing an arrival angle signal indicative of the determined arrival angle when it determines that the estimated arrival angle corresponds to the direction of the road.

(Supplementary note 34) The computer-readable storage medium as recited in Supplementary note 32 or 33, wherein the frequency shift calculation function causes the computer to implement:

a frequency shift estimation function of estimating frequency shifts in a continuous manner from baseband signals after the formation of the directional beam;

a function of storing frequency shift signals indicative of the estimated frequency shifts in a frequency shift storage device in a continuous manner; and a frequency shift averaging function of reading the frequency shift signals stored for each average period from the frequency shift storage device and of calculating the average frequency shift.

(Supplementary note 35) The computer-readable storage medium as recited in Supplementary note 29, wherein the receiver part includes first to Mth array antennas including M antenna elements where M is an integer not less than 2, and first to Mth radio receiver parts operable to convert first to Mth radio signals received by the first to Mth array antennas into first to Mth baseband signal to output the first to Mth baseband signals as the received signals, wherein the speed/direction estimation function causes the computer to implement:

an arrival angle estimation/determination function of estimating and determining current arrival angles of the received signals each having the best reception quality from among the first to Mth baseband signals;

a directional beam formation function of forming directional beams corresponding to the current arrival angles to output baseband signals after the formation of the directional beams;

a frequency shift calculation function of estimating frequency shifts from the baseband signals after the formation of the directional beams and of calculating an average frequency shift by averaging the frequency shifts;

a function of storing a current arrival angle signal indicative of the current arrival angle in a last arrival angle storage device to output a last arrival angle signal indicative of a last arrival angle from the last arrival angle storage device;

a traveling direction determination function of determining a traveling direction of the vehicle from the last arrival angle and the current arrival angle;

a traveling speed calculation function of calculating a relative traveling speed of the vehicle with respect to the base station from the average frequency shift; and a traveling speed correction function of correcting the relative traveling speed of the vehicle based upon the current arrival angle to calculate a traveling speed of the vehicle.

(Supplementary note 36) The computer-readable storage medium as recited in Supplementary note 35, wherein the arrival angle estimation/determination function causes the computer to implement:

an arrival angle calculation function of estimating a current arrival angle of the received signal having the best reception quality for each mobile terminal from among the first to Mth baseband signals, and an arrival angle determination function of determining whether or not the estimated current arrival angle corresponds to a direction of the road to output a current arrival angle signal indicative of the current arrival angle when it determines that the estimated current arrival angle corresponds to the direction of the road.

(Supplementary note 37) The computer-readable storage medium as recited in Supplementary note 35 or 36, wherein the frequency shift calculation function causes the computer to implement:

a frequency shift estimation function of estimating frequency shifts in a continuous manner from baseband signals after the formation of the directional beams, a function of storing frequency shift signals indicative of the estimated frequency shifts in a frequency shift storage device in a continuous manner; and a frequency shift averaging function of reading the frequency shift signals stored for each average period from the frequency shift storage device and of calculating the average frequency shift.

(Supplementary note 38) The computer-readable storage medium as recited in Supplementary note 29, wherein the receiver part periodically receives, as the communication signals, signals including positional information from the mobile terminals in the respective vehicles to output the received signals, wherein the speed/direction estimation function causes the computer to implement:

a positional information identification function of identifying a current vehicle position on the road from the signal including the positional information to output current vehicle positional information indicative of the current vehicle position and a positional information reception cycle;

a function of storing the current vehicle positional information in a last positional information storage device to output last vehicle positional information indicative of a last vehicle position from the last positional information storage device;

a traveling distance/traveling direction calculation function of calculating a traveling distance of each vehicle and a traveling direction of each vehicle from the last vehicle position and the current vehicle position; and a traveling speed calculation function of calculating a traveling speed of each vehicle with use of the traveling distance and the positional information reception cycle.

(Supplementary note 39) The computer-readable storage medium as recited in Supplementary note 38, wherein the positional information identification function causes the computer to implement:

a positional information receiver function of calculating a reception quality of the received signal for each mobile terminal, of extracting positional terminal information indicative of a position of the mobile terminal from the received signals having a reception quality higher than a preset value, and of producing the positional terminal information; and a positional information determination function of comparing preset positional information of the road with the positional terminal information to output the current vehicle positional information and the positional information reception cycle when the position of the mobile terminal matches with any position of the road.

(Supplementary note 40) The computer-readable storage medium as recited in any one of Supplementary notes 29 to 39, wherein the traffic condition analysis function causes the computer to implement:

an effective speed determination function of determining whether or not a current traveling speed of each vehicle is effective to output an effective traveling speed signal indicative of the effective traveling speed;

a function of storing the effective traveling speed signal of each vehicle in each traveling direction in a traveling speed storage device;

a vehicle group average speed calculation function of reading the effective traveling speed signals of all vehicles in each traveling direction from the traveling speed storage device and of calculating an average of the effective traveling speeds of all vehicles to obtain the average traveling speed of the group of vehicles in each traveling direction; and a traffic condition determination function of determining the traffic condition in each traveling direction based upon the average traveling speed of the group of vehicles in each traveling direction.

(Supplementary note 41) The computer-readable storage medium as recited in Supplementary note 40, wherein the effective speed determination function causes the computer to implement:

a traveling speed variation calculation function of reading an effective traveling speed signal of the vehicle that was calculate last time, as a last traveling speed signal indicative of the last traveling speed, from the traveling speed storage device and of calculating a variation of the current traveling speed of the vehicle with respect to the last traveling speed;

a traveling speed deviation calculation function of calculating a deviation of the current traveling speed of the vehicle with respect to the average traveling speed of the group of vehicles in each traveling direction; and an effective traveling speed determination function of determining whether or not the current traveling speed of the vehicle is effective based upon the variation and the deviation to output the effective traveling speed signal.

(Supplementary note 42) The computer-readable storage medium as recited in Supplementary note 40 or 41, wherein the traffic condition determination function causes the computer to implement determining of the traffic condition in each traveling direction from among a smooth condition, a spontaneously congested condition, a spontaneously jammed condition, a congested condition by accident, and a jammed condition by accident, based upon the average traveling speed of the group of vehicles in each traveling direction, a congestion threshold value, a jam threshold value, and accident occurrence information.

DESCRIPTION OF REFERENCE NUMERALS

100 . . . antenna
100-1 to 100-N . . . sector antenna
102 . . . radio receiver part
102-1 to 102-N . . . radio receiver part
102-1 to 102-M . . . radio receiver part
103-1 to 103-N . . . baseband signal
103-1 to 103-M . . . baseband signal
104 . . . sector selection part
105 . . . selected sector number
106 . . . received signal (baseband signal) of the selected sector
107 . . . frequency shift estimation part
108 . . . frequency shift signal
109 . . . frequency shift storage device
110 . . . frequency shift signal
111 . . . frequency shift average part
112 . . . average frequency shift signal
113 . . . traveling direction determination part
114 . . . traveling direction signal
115 . . . traveling speed calculation part
116 . . . relative traveling speed signal
117 . . . traveling speed correction part
118 . . . traveling speed signal
119 . . . traveling speed variation calculation part
120 . . . variation of the current traveling speed
121 . . . traveling speed deviation calculation part
122 . . . deviation of the current traveling speed
123 . . . effective traveling speed determination part
124 . . . effective traveling speed signal
125 . . . traveling speed storage device
126 . . . last traveling speed signal (effective traveling speed signal)
127 . . . vehicle group average traveling speed calculation part
128 . . . vehicle group average traveling speed signal
129 . . . traffic condition determination part
200, 200A, 200B . . . base station
210 . . . road
500-1 to 500-M . . . array antenna
501 . . . arrival angle calculation part
502 . . . arrival angle signal
503 . . . arrival angle determination part
504 . . . arrival angle signal (current arrival angle signal)
505 . . . directional beam formation part
506 . . . baseband signal after formation of directional beam
507 . . . traveling direction determination part
508 . . . traveling speed correction part
700 . . . last arrival angle storage device
701 . . . last arrival angle signal
702 . . . traveling direction determination part
800 . . . positional information receiver part
801 . . . positional terminal information
802 . . . positional information determination part
803 . . . positional information reception cycle
804 . . . current vehicle positional information
805 . . . last positional information storage device
806 . . . last vehicle positional information
807 . . . traveling distance/traveling direction calculation part
808 . . . traveling distance signal
809 . . . traveling speed calculation part
1000, 1000A, 1000B . . . receiver part
2000, 2000A, 2000B, 2000C . . . speed/direction estimation part
3000 . . . traffic condition analysis part This application is based upon and claims the benefit of priority from Japanese patent application No. 2011-093706, filed on Apr. 20, 2011, the disclosure of which is incorporated herein in its entirety by reference.

The invention claimed is:

1. A traffic condition monitoring system provided in a base station installed by a side of a road for monitoring a traffic condition based upon communication signals transmitted from mobile terminals of a plurality of vehicles traveling on the road, the system comprising:

a receiver part operable to receive the communication signals transmitted from the mobile terminals of the respective vehicles to output received signals;

a speed/direction estimation part operable to estimate traveling speeds and traveling directions of the respective vehicles based upon frequency shifts estimated from the received signals; and a traffic condition analysis part operable to determine effective traveling speeds of the respective vehicles in each traveling direction, to calculate an average traveling speed of a group of vehicles in each traveling direction, and to analyze a traffic condition in each traveling direction based upon the average traveling speed of the group of vehicles in each traveling direction, wherein the receiver part includes:
first to Nth sector antennas disposed for N sectors where N is an integer not less than 2; and
first to Nth radio receiver parts operable to convert first to Nth radio signals received by the first to Nth sector antennas into first to Nth baseband signals to output the first to Nth baseband signals as the received signals.

2. The traffic condition monitoring system as recited in claim 1, wherein the traffic condition analysis part includes:
an effective speed determination part operable to determine whether a current traveling speed of each vehicle is effective to output an effective traveling speed signal indicative of the effective traveling speed;
a traveling speed storage device operable to store the effective traveling speed signal of each vehicle in each traveling direction;
a vehicle group average traveling speed calculation part operable to read the effective traveling speed signals of all vehicles in each traveling direction from the traveling speed storage device, and to calculate an average of the effective traveling speeds of all vehicles to obtain the average traveling speed of the group of vehicles in each traveling direction; and
a traffic condition determination part operable to determine the traffic condition in each traveling direction based upon the average traveling speed of the group of vehicles in each traveling direction.

3. The traffic condition monitoring system as recited in claim 2, wherein the traffic condition determination part is operable to determine the traffic condition in each traveling direction from among a smooth condition, a spontaneously congested condition, a spontaneously jammed condition, a congested condition by accident, and a jammed condition by accident, based upon the average traveling speed of the group of vehicles in each traveling direction, a congestion threshold value, a jam threshold value, and accident occurrence information.

4. The traffic condition monitoring system as recited in claim 1, wherein the speed/direction estimation part includes:
a sector selection part operable to select a sector in which a received signal of the received signals has a best reception quality from among the first to Nth baseband signals to output the received signals of the selected sector and a selected sector number.

5. The traffic condition monitoring system as recited in claim 4, wherein the speed/direction estimation part further includes:
a frequency shift calculation part operable to estimate frequency shifts from the received signals of the selected sector and to calculate an average frequency shift by averaging the frequency shifts.

6. The traffic condition monitoring system as recited in claim 5, wherein the speed/direction estimation part further includes:
a traveling direction determination part operable to determine a traveling direction of the vehicle from the selected sector number and the average frequency shift.

7. The traffic condition monitoring system as recited in claim 6, wherein the speed/direction estimation part further includes:
a traveling speed calculation part operable to calculate a relative traveling speed of the vehicle with respect to the base station from the average frequency shift; and
a traveling speed correction part operable to correct the relative traveling speed of the vehicle based upon the arrival angle to calculate a traveling speed of the vehicle.

8. A traffic condition monitoring system provided in a base station installed by a side of a road for monitoring a traffic condition based upon communication signals transmitted from mobile terminals of a plurality of vehicles traveling on the road, the system comprising:
a receiver part operable to receive the communication signals transmitted from the mobile terminals of the respective vehicles to output received signals;
a speed/direction estimation part operable to estimate traveling speeds and traveling directions of the respective vehicles based upon frequency shifts estimated from the received signals; and
a traffic condition analysis part operable to determine effective traveling speeds of the respective vehicles in each traveling direction, to calculate an average traveling speed of a group of vehicles in each traveling direction, and to analyze a traffic condition in each traveling direction based upon the average traveling speed of the group of vehicles in each traveling direction, wherein the receiver part includes:
first to Mth array antennas including M antenna elements where M is an integer not less than 2; and
first to Mth radio receiver parts operable to convert first to Mth radio signals received by the first to Mth array antennas into first to Mth baseband signals and to output the first to Mth baseband signals as the received signals.

9. The traffic condition monitoring system as recited in claim 8, wherein the speed/direction estimation part includes:
an arrival angle estimation/determination part operable to estimate and determine current arrival angles of the received signals each having a best reception quality from among the first to Mth baseband signals.

10. The traffic condition monitoring system as recited in claim 8, wherein the speed/direction estimation part further includes:
an arrival angle estimation/determination part operable to estimate and determine an arrival angle of the received signal having the best reception quality from among the first to Mth baseband signals.

11. The traffic condition monitoring system as recited in claim 10, wherein the speed/direction estimation part further includes:
a directional beam formation part operable to form a directional beam corresponding to the determined arrival angle and to output baseband signals after the formation of the directional beam.

12. The traffic condition monitoring system as recited in claim 11, wherein the speed/direction estimation part further includes:
a frequency shift calculation part operable to estimate frequency shifts from the baseband signals after the formation of the directional beam and to calculate an average frequency shift by averaging the frequency shifts.

13. The traffic condition monitoring system as recited in claim 12, wherein the speed/direction estimation part further includes:
a traveling direction determination part operable to determine a traveling direction of the vehicle from the arrival angle and the average frequency shift.

14. The traffic condition monitoring system as recited in claim 9, wherein the speed/direction estimation part further includes:
- a directional beam formation part operable to form directional beams corresponding to the current arrival angles to output baseband signals after the formation of the directional beam.

15. The traffic condition monitoring system as recited in claim 14, wherein the speed/direction estimation part further includes:
- a frequency shift calculation part operable to estimate frequency shifts from the baseband signals after the formation of the directional beam and to calculate an average frequency shift by averaging the frequency shifts.

16. The traffic condition monitoring system as recited in claim 15, wherein the speed/direction estimation part further includes:
- a last arrival angle storage device operable to store a current arrival angle signal indicative of the current arrival angle to output a last arrival angle signal indicative of a last arrival angle; and
- a traveling direction determination part operable to determine a traveling direction of the vehicle from the last arrival angle and the current arrival angle.

17. The traffic condition monitoring system as recited in claim 13, wherein the speed/direction estimation part further includes:
- a traveling speed calculation part operable to calculate a relative traveling speed of the vehicle with respect to the base station from the average frequency shift; and
- a traveling speed correction part operable to correct the relative traveling speed of the vehicle based upon the arrival angle to calculate a traveling speed of the vehicle.

18. The traffic condition monitoring system as recited in claim 16, wherein the speed/direction estimation part further includes:
- a traveling speed calculation part operable to calculate a relative traveling speed of the vehicle with respect to the base station from the average frequency shift; and
- a traveling speed correction part operable to correct the relative traveling speed of the vehicle based upon the current arrival angle to calculate a traveling speed of the vehicle.

19. The traffic condition monitoring system as recited in claim 8, wherein the traffic condition analysis part includes:
- an effective speed determination part operable to determine whether a current traveling speed of each vehicle is effective to output an effective traveling speed signal indicative of the effective traveling speed;
- a traveling speed storage device operable to store the effective traveling speed signal of each vehicle in each traveling direction;
- a vehicle group average traveling speed calculation part operable to read the effective traveling speed signals of all vehicles in each traveling direction from the traveling speed storage device, and to calculate an average of the effective traveling speeds of all vehicles to obtain the average traveling speed of the group of vehicles in each traveling direction; and
- a traffic condition determination part operable to determine the traffic condition in each traveling direction based upon the average traveling speed of the group of vehicles in each traveling direction.

20. The traffic condition monitoring system as recited in claim 19, wherein the traffic condition determination part is operable to determine the traffic condition in each traveling direction from among a smooth condition, a spontaneously congested condition, a spontaneously jammed condition, a congested condition by accident, and a jammed condition by accident, based upon the average traveling speed of the group of vehicles in each traveling direction, a congestion threshold value, a jam threshold value, and accident occurrence information.

* * * * *